United States Patent
Burkett et al.

(10) Patent No.: US 10,295,771 B2
(45) Date of Patent: May 21, 2019

(54) TELECOMMUNICATIONS TERMINAL WITH REMOVABLE MODULES

(71) Applicant: Corning Optical Communications LLC, Hickory, NC (US)

(72) Inventors: Alan Duncan Burkett, Bedford, TX (US); Joshua David Henley, Keller, TX (US); Joseph Ronald Herridge, North Richland Hills, TX (US); Joseph Clinton Jensen, Lawndale, NC (US); Diana Rodriguez, Forth Worth, TX (US); David Kimondo Waruiru, Fort Worth, TX (US); Leydys Deniss De Jesús, Huntersville, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/490,162

(22) Filed: Apr. 18, 2017

(65) Prior Publication Data

US 2017/0322384 A1    Nov. 9, 2017

Related U.S. Application Data

(60) Provisional application No. 62/382,590, filed on Sep. 1, 2016, provisional application No. 62/351,493, filed
(Continued)

(51) Int. Cl.
*G02B 6/44* (2006.01)
*G02B 6/38* (2006.01)

(52) U.S. Cl.
CPC ......... *G02B 6/4447* (2013.01); *G02B 6/3897* (2013.01); *G02B 6/4452* (2013.01); *G02B 6/4453* (2013.01); *G02B 6/4454* (2013.01)

(58) Field of Classification Search
CPC ... G02B 6/4452–6/4455; G02B 6/4447; G02B 6/3897
See application file for complete search history.

(56) References Cited

U.S. PATENT DOCUMENTS

| 4,568,145 A | 2/1986 | Colin et al. |
| 5,048,914 A | 9/1991 | Sneddon |

(Continued)

FOREIGN PATENT DOCUMENTS

| CA | 2080009 A1 | 11/1991 |
| CA | 2602293 C | 4/2012 |

(Continued)

OTHER PUBLICATIONS

U.S. Appl. No. 62/331,040, A. Burkett et al., "Fiber Optic Terminal for Distributed Split Fiber Optic Network," filed May 3, 2016.
(Continued)

*Primary Examiner* — Rhonda S Peace
(74) *Attorney, Agent, or Firm* — Grant A. Gildehaus

(57) ABSTRACT

A fiber optic terminal includes an enclosure defining an interior space having a plurality module holders and at least one module removably positioned in one of the plurality of module holders. Each removable module may include at least one input adapter and a plurality of output adapters. Each removable module may also include one or more splitters, cable storage components, pass-through components, or parking components. The fiber optic module may also include first and second arms extending from the front side of the body and a handle coupled to the first and second arms. The handle may be rotatable between a closed position and an open position, and may also be removable from the first and second arms when the handle is in the open position.

25 Claims, 16 Drawing Sheets

Related U.S. Application Data on Jun. 17, 2016, provisional application No. 62/373,549, filed on Aug. 11, 2016, provisional application No. 62/331,040, filed on May 3, 2016.

(56) References Cited

U.S. PATENT DOCUMENTS

| | | | |
|---|---|---|---|
| 5,140,658 A | 8/1992 | Sunshine | |
| 5,210,810 A | 5/1993 | Darden et al. | |
| 5,461,688 A | 10/1995 | Lee | |
| 5,473,715 A | 12/1995 | Schofield et al. | |
| 5,542,015 A | 7/1996 | Hultermans | |
| 5,715,348 A | 2/1998 | Falkenberg et al. | |
| 5,722,842 A | 3/1998 | Cairns | |
| 5,754,724 A | 5/1998 | Peterson et al. | |
| 5,881,191 A | 3/1999 | Liberty | |
| 5,949,946 A | 9/1999 | Debortoli et al. | |
| 6,021,246 A | 2/2000 | Koshiyama et al. | |
| 6,264,374 B1 | 7/2001 | Selfridge et al. | |
| 6,364,539 B1 | 4/2002 | Shahid | |
| 6,385,374 B2 | 5/2002 | Kropp | |
| 6,533,465 B1 | 3/2003 | Lesesky et al. | |
| 6,736,545 B2 | 5/2004 | Cairns et al. | |
| 6,792,191 B1* | 9/2004 | Clapp, Jr. | G02B 6/4452 385/135 |
| 6,931,193 B2 | 8/2005 | Barnes et al. | |
| 6,952,530 B2 | 10/2005 | Helvajian et al. | |
| 6,974,262 B1 | 12/2005 | Rickenbach | |
| 7,074,066 B2 | 7/2006 | Pepe | |
| 7,118,284 B2 | 10/2006 | Nakajima et al. | |
| 7,171,100 B2* | 1/2007 | Solheid | G02B 6/4452 385/134 |
| 7,218,828 B2* | 5/2007 | Feustel | G02B 6/2804 385/134 |
| 7,220,065 B2 | 5/2007 | Han et al. | |
| 7,300,216 B2 | 11/2007 | Morse et al. | |
| 7,304,241 B2 | 12/2007 | Trieb et al. | |
| 7,400,816 B2* | 7/2008 | Reagan | G02B 6/3849 385/134 |
| 7,409,138 B1 | 8/2008 | Frazier et al. | |
| 7,515,805 B2* | 4/2009 | Vongseng | G02B 6/3825 385/134 |
| 7,526,172 B2 | 4/2009 | Gniadek et al. | |
| 7,623,749 B2* | 11/2009 | Reagan | G02B 6/4452 385/135 |
| 7,738,759 B2 | 6/2010 | Parikh et al. | |
| 7,744,286 B2 | 6/2010 | Lu et al. | |
| 7,764,858 B2 | 7/2010 | Bayazit et al. | |
| 7,942,587 B2 | 5/2011 | Barnes et al. | |
| 8,107,785 B2 | 1/2012 | Berglund et al. | |
| 8,164,044 B2 | 4/2012 | Mossman | |
| 8,380,036 B2 | 2/2013 | Smith | |
| 8,480,312 B2 | 7/2013 | Smith et al. | |
| 8,520,997 B2 | 8/2013 | Zimmel | |
| 8,794,852 B2 | 8/2014 | Barron et al. | |
| 2003/0156798 A1 | 8/2003 | Cull | |
| 2003/0174996 A1 | 9/2003 | Henschel et al. | |
| 2005/0082467 A1 | 4/2005 | Mossman | |
| 2006/0133759 A1 | 6/2006 | Mullaney et al. | |
| 2006/0171639 A1 | 8/2006 | Dye | |
| 2006/0228086 A1 | 10/2006 | Holmberg et al. | |
| 2007/0014522 A1 | 1/2007 | Yamaguchi et al. | |
| 2007/0031100 A1* | 2/2007 | Garcia | G02B 6/4452 385/135 |
| 2007/0147765 A1* | 6/2007 | Gniadek | G02B 6/4453 385/135 |
| 2007/0263964 A1 | 11/2007 | Cody et al. | |
| 2008/0031585 A1* | 2/2008 | Solheid | G02B 6/4452 385/135 |
| 2008/0050070 A1 | 2/2008 | Gurreri et al. | |
| 2008/0175543 A1 | 7/2008 | Durrant et al. | |
| 2009/0148104 A1 | 6/2009 | Lu et al. | |
| 2009/0162016 A1 | 6/2009 | Lu et al. | |
| 2009/0245743 A1 | 10/2009 | Cote et al. | |
| 2010/0027955 A1 | 2/2010 | Parikh et al. | |
| 2010/0040331 A1 | 2/2010 | Khemakhem et al. | |
| 2010/0079759 A1 | 4/2010 | Mossman | |
| 2010/0129039 A1 | 5/2010 | Smrha et al. | |
| 2010/0183276 A1* | 7/2010 | Smith | G02B 6/4452 385/135 |
| 2010/0303431 A1 | 12/2010 | Cox et al. | |
| 2010/0329624 A1 | 12/2010 | Zhou et al. | |
| 2011/0123157 A1 | 5/2011 | Belsan et al. | |
| 2011/0200286 A1 | 8/2011 | Smith et al. | |
| 2011/0211326 A1 | 9/2011 | Drouard et al. | |
| 2011/0211799 A1 | 9/2011 | Conner et al. | |
| 2011/0229083 A1 | 9/2011 | Dainese Junior et al. | |
| 2012/0039571 A1 | 2/2012 | Ciechomski et al. | |
| 2012/0328258 A1 | 12/2012 | Barron et al. | |
| 2014/0314384 A1 | 10/2014 | Nair et al. | |
| 2015/0063772 A1 | 3/2015 | Beamon et al. | |
| 2015/0110442 A1 | 4/2015 | Zimmel et al. | |
| 2015/0355428 A1 | 12/2015 | Leeman et al. | |
| 2016/0011391 A1 | 1/2016 | Montalvo et al. | |

FOREIGN PATENT DOCUMENTS

| | | |
|---|---|---|
| CH | 689434 A5 | 4/1999 |
| CN | 101521545 A | 9/2009 |
| EP | 1199587 A1 | 4/2002 |
| JP | 07072338 A | 3/1995 |
| WO | 2005078493 A1 | 8/2005 |
| WO | 2006044080 A1 | 4/2006 |
| WO | 2006060250 A2 | 6/2006 |
| WO | 2006123214 A1 | 11/2006 |
| WO | 2010062626 A1 | 6/2010 |
| WO | 2011112764 A1 | 9/2011 |
| WO | 2012135312 A1 | 10/2012 |

OTHER PUBLICATIONS

U.S. Appl. No. 62/373,549, A. Burkett et al., "Fiber Optic Terminal for Distributed Split Fiber Optic Network," filed Aug. 11, 2016.
International Search Report and Written Opinion PCT/US2017/029589 dated Jul. 12, 2017.

\* cited by examiner

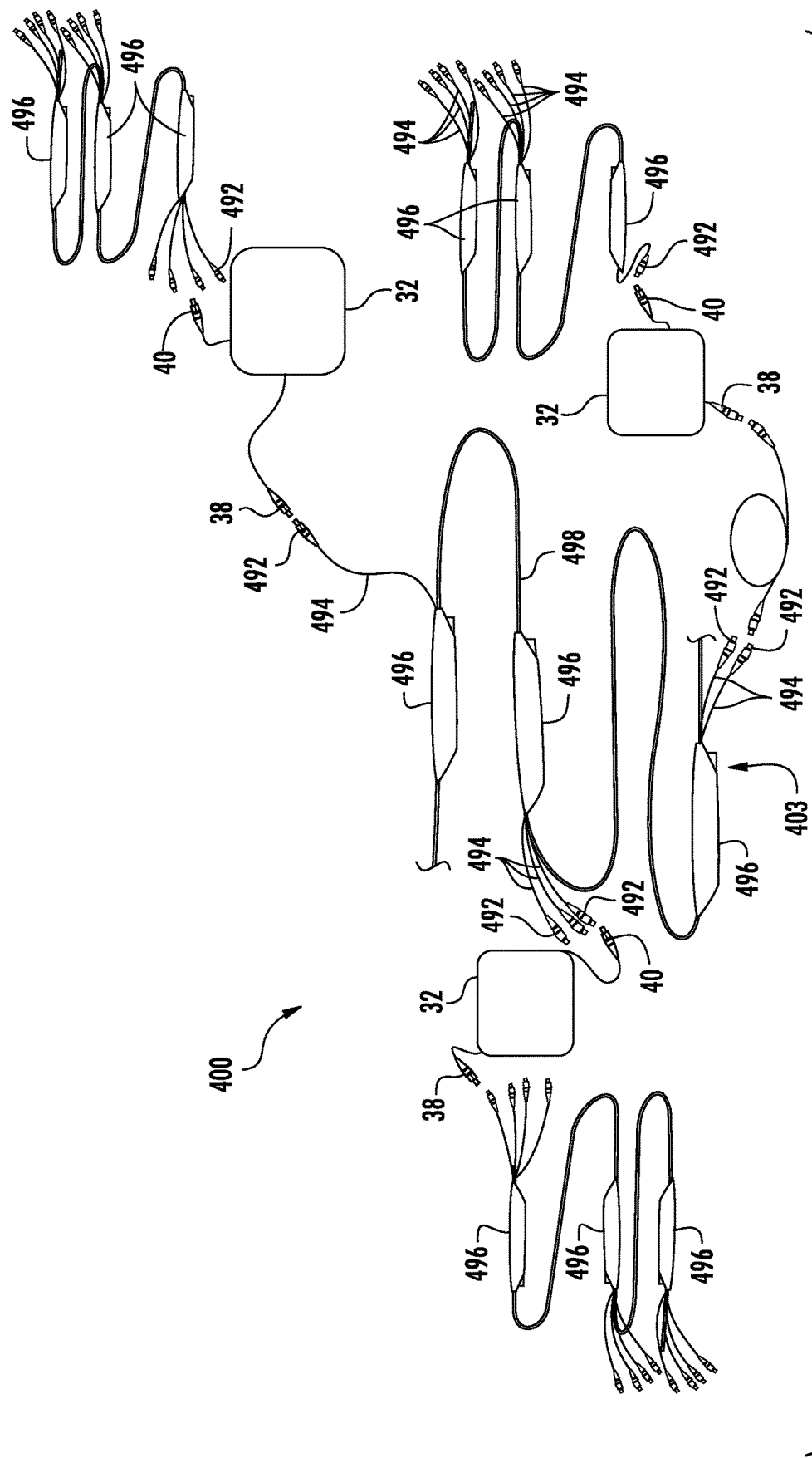

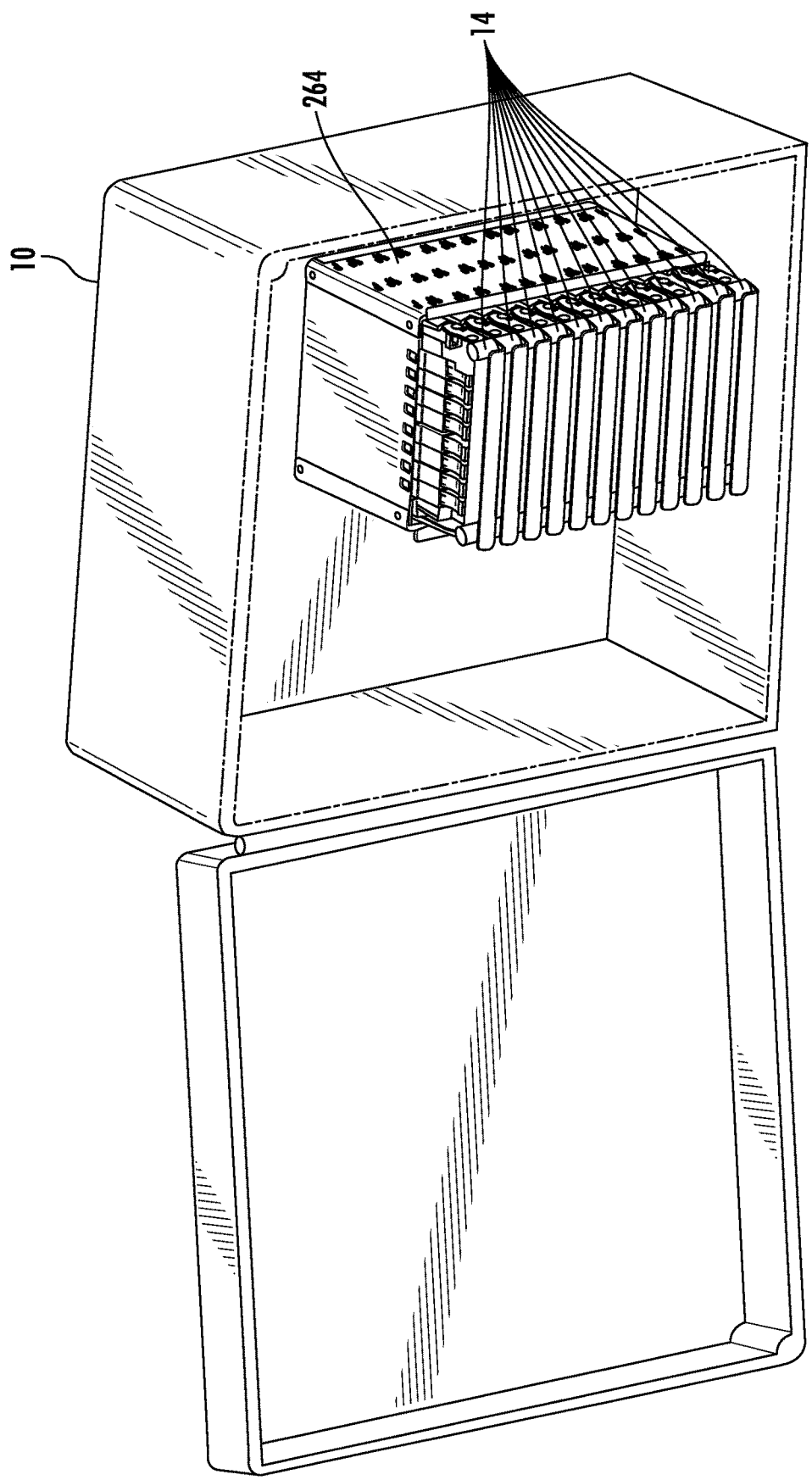

400

```
┌─────────────────────────────────────────────────────────────┐
│ INSERT ONE OR MORE ELEMENT INTO AN INTERIOR SPACE OF A       │  402
│ FIBER OPTIC MODULE, WHEREIN THE ONE OR MORE ELEMENTS ARE     │
│ SELECTED FROM THE GROUP CONSISTING OF: A SPLITTER, CABLE     │
│ STORAGE COMPONENTS, FIBER STORAGE COMPONENTS,                │
│ PASS-THROUGH FIBER COMPONENTS, PARKING COMPONENTS, AND       │
│ SPLICE COMPONENTS.                                           │
└─────────────────────────────────────────────────────────────┘
                              │
                              ▼
┌─────────────────────────────────────────────────────────────┐
│ REMOVABLY COUPLE A HANDLE TO A FIRST ARM AND A SECOND ARM   │
│ OF THE FIBER OPTIC MODULE. THE HANDLE 204 IS ROTATABLE WITH │
│ RESPECT TO THE FIRST AND SECOND ARMS BETWEEN AN OPEN        │
│ POSITION AND A CLOSED POSITION. THE FIRST AND SECOND ARMS   │
│ INCLUDE PROTRUSIONS THAT MATE WITH FIRST OPENINGS ON THE    │  404
│ HANDLE TO HINGEDLY COUPLE THE HANDLE TO THE BODY.           │
│ THE FIRST AND SECOND ARMS ALSO INCLUDE LOCKING FEATURES     │
│ THAT MATE WITH SECOND OPENINGS IN THE HANDLE TO RELEASEABLY │
│ MAINTAIN THE HANDLE IN THE CLOSED POSITION. THE FIRST AND   │
│ SECOND ARMS ARE DEFLECTABLE TO RELEASE THE LOCKING FEATURES │
│ FROM THE THE SECOND OPENINGS TO ALLOW THE HANDLE TO ROTATE  │
│ FROM THE CLOSED POSITION TO THE OPEN POSITION.              │
└─────────────────────────────────────────────────────────────┘
```

FIG. 19

TELECOMMUNICATIONS TERMINAL WITH REMOVABLE MODULES

PRIORITY CLAIM

This application claims the benefit of priority of U.S. Provisional Patent Application Ser. No. 62/331,040, filed May 3, 2016, U.S. Provisional Patent Application Ser. No. 62/351,493, filed Jun. 17, 2016, U.S. Provisional Patent Application Ser. No. 62/373,549, filed Aug. 11, 2016, and U.S. Provisional Patent Application Ser. No. 62/382,590, filed Sep. 1, 2016, the content of each of which is relied upon and incorporated herein by reference in its entirety.

BACKGROUND

Field

The present invention relates generally to fiber optic terminals, and more particularly to fiber optic terminals that have a small form factor and are variably configurable for use in a centralized or distributed split fiber optic network. The present disclosure also relates to removable modules for use in fiber optic terminals, and, more particularly, to reversible modules that can be easily installed in fiber optic terminals and oriented to provide a desired layout of input and output adapters.

Technical Background

Fiber optic terminals in a fiber optic network may be referred to as local convergence points (LCP), fiber distribution terminals (FDT), fiber distribution hubs (FDH), and the like. Such fiber optic terminals may be cabinets or enclosures which may house fiber connection points, splices, splitter modules, or other components. For example, the splitter modules may split an optical signal from a network operator or service provider into many optical signals for distribution to subscribers. This enables the transmission of individual optical signals to subscriber premises in the optical network. The fiber optic terminal provides a convergence point for management of the fibers and the optical signals between the network operator or service provider and the subscriber.

Referring now to FIG. 1, fiber to the premises services, which includes single-family residences 904, multifamily residences, businesses, and other locations with high bandwidth requirements, have traditionally utilized a network architecture that relies on information transmitted from a central office 900 to a local convergence point 902 containing all of the optical network splitters 906 for the system. In most cases, the signal from the central office undergoes a 1×32 split at the local convergence point 902 and then 32 individual fibers are connected directly or indirectly to the customer premises 904 via an optical network terminal 908. While only one 1×32 splitter 906 is illustrated in FIG. 1, the local convergence point may have more than one splitter to provide an increased number of output signals. This network configuration is referred to as a centralized split network architecture.

In a centralized split architecture, the local convergence point 902 or fiber distribution hub is typically designed to service from 144 to 864 customers, but can service more or less customers depending on a particular installation. Traditional fiber distribution hubs provide for the management of input and output fiber cables, mounting of splitters 906, and fixed input and distribution fields that are factory configured to accommodate the maximum number of connections. Due to the large number of customers serviced by a single fiber distribution hub, the equipment size and insulation requirements for the fiber distribution hubs in a centralized split architecture can be extensive and costly. Installation typically includes one or more steps which may include permitting with the local municipality, deployment of underground cables, placement of a splice vault in concrete pad, and securing the equipment cabinet to the pad.

To allow service providers a more modular and customizable fiber distribution architecture, many providers have moved from centralized split architectures to distributed split architectures. FIG. 2 illustrates an example distributed split architecture that utilizes splitters 910, 912 at multiple splitter locations in the architecture to achieve the desired split level. In FIG. 2, a 1×4 splitter 910 is followed by two 1×8 splitters 912 to create bandwidth sharing equivalent to a single 1×32 splitter. As discussed above, each split location may include additional splitters. The deep positioning of splitters 910, 912 in a distributed split architecture results in stranding of splitter assets as the carrier awaits new subscribers on the network or take rates are initially low. While distributed split architectures are more modular and customizable, current fiber optic terminals, many of which are large, costly, and may require placement of a concrete pad, lack features and design which would be beneficial in deploying a cost-effective and user-friendly distributed split fiber optic network.

SUMMARY OF THE DETAILED DESCRIPTION

Embodiments disclosed herein provide for a fiber optic terminal that has a small form factor and is customizable to accommodate changes in the bandwidth needs of a particular network. The fiber optic terminal may enable pole or wall-mounted installations, reducing installation time and costs, and customized network applications. In contrast to traditional terminals, which may be large, heavy cabinet enclosures requiring a lift truck and concert pad for installation, the fiber optic terminal of the present disclosure is small and lightweight, and, in some cases, can be installed by a single person without the use of a lift truck.

The fiber optic terminal includes module holders that accept removable, configurable modules to allow for increased customization. The removable modules include input and output adapters for feeder and distribution fiber connections. The module holders are aligned in the fiber optic terminal such that when two or more modules are positioned in the module holders, the input and distribution adapters of the modules are aligned to form input and distribution fields in the fiber optic terminal. Each removable module may include one or more of the following: a splitter, cable or fiber storage components, pass-through fiber components, connector parking components, splice components, input adapters, and distribution adapters. Each fiber optic terminal is customizable by incorporating one or more modules having the required functionality into the module holders. Each module holder need not include a module at all times.

An example fiber distribution hub may include an enclosure defining an interior space, a feeder cable port for receiving into the interior space a feeder cable having at least one optical fiber, and a distribution cable port for receiving into the interior space a distribution cable having at least one optical fiber. A user may insert feeder and distribution cables through the feeder and distribution ports, respectively. The feeder and distribution cables may each have connectors positioned outside of the enclosure, at an exterior wall of the enclosure, or within the enclosure. The polarity of the connectors of the feeder cable may be different than the polarity of the connectors of the distribution cables to allow a user to easily bypass the fiber optic terminal or to link multiple fiber optic terminals in a series.

The fiber optic terminal may also include at least one module holder positioned in the interior space. Each of the module holders is configured to receive a removable module. As discussed above, the modules may include a splitter or pass-through components. The optical fiber or fibers of the feeder cable are optically connected to one or more optical fibers of the distribution cable through the splitter or pass-through components of the module. The optical fiber or fibers of the feeder cable may be connectorized so that they are couplable to one or more input adapters on the module and the optical fiber or fibers of the distribution cable may also be connectorized so that they are couplable to one or more distribution adapters on the module.

The present disclosure also includes a method for forming a fiber optic terminal. The method may include inserting a feeder cable and a distribution cable into an enclosure defining an interior space. The feeder cable may include an optical fiber and a first connector coupled to the optical fiber, and the distribution cable may include an optical fiber and a second connector coupled to the optical fiber. One or more modules are inserted into one or more module holders of the enclosure, as discussed above. The connector or connectors of the feeder cable are then directly coupled to input adapters on the module and the connector or connectors of the distribution cable are directly coupled to distribution adapters on the module.

Embodiments disclosed herein also provide for a fiber optic module that is reversibly positionable in the module holder. The module can be positioned in a first position in the module holder, for example with an top face of the module facing upwards in the module holder, and can also be positioned in a second, opposite position in the module holder, for example with the top face of the module facing downwards in the module holder. This allows for customization of the location of the input adapters and output adapters. For example, in a fiber optic terminal having a column of vertically aligned module holders, the modules may be installed with the input adapters on a left-hand side for a particular application or on the right-hand side for another application. It is to be understood that directional terms, such as "top," "bottom," "upper," "lower," "left," "right," "medial," "distal," etc., are used for non-limiting illustrative purposes only.

The modules may also include a handle that is reversibly attachable to the module to match the orientation of the module within the module holder. The reversibility of the body and the handle provides for routing efficiency, enhanced organizational options, and ease of use for the modules within a fiber optic terminal.

An example fiber optic module may include a body defining a front side, a rear side, a first side face, a second side face, a top face, a bottom face, and an interior volume between the front side, the rear side, the first side face, the second side face, the top face and the bottom face. The fiber optic module may also include an input adapter positioned on a front side of the body and an output adapter positioned on the front side of the body. The fiber optic module may include a first arm extending from the front side of the body, a second arm extending from the front side of the body, a first flange extending from the first side face, and a second flange extending from the second side face. The first and second flanges may extend at a plane that bisects the body. The fiber optic module may also include a handle that is coupleable to the first and second arms. The handle is pivotably coupled to the first and second arms and is rotatable between a closed position and an open position. The handle is removable from the first and second arms when the handle is in the open position and the handle is not removable from the first and second arms when the handle is in the closed position.

The present disclosure also includes a method for forming a fiber optic module. The method may include incorporating a splitter into an interior space of a fiber optic module. The method may also include coupling a handle to a first arm and a second arm of the fiber optic module. The handle is rotatable with respect to the first and second arms between an open position and a closed position. The first arm may include a first protrusion and the second arm may include a second protrusion. The first protrusion mates with a first opening in the handle and the second protrusion mates with a second opening in the handle to hingedly couple the handle to the body. In addition, the first arm may include a first locking feature and the second arm may include a second locking feature. The first locking feature mates with a third opening in the handle and the second locking feature mates with a fourth opening in the handle to releaseably maintain the handle in the closed position. The first and second arms may be deflectable to release the first locking feature from the third opening and to release the second locking feature from the fourth opening. The handle is rotatable from the closed position to the open position when the first locking feature is released from the third opening and the second locking feature is released from the fourth opening.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

BRIEF DESCRIPTION OF THE FIGURES

FIG. 5 is a schematic view of an example of a system having multiple fiber optic terminals in accordance with the present disclosure.

FIG. 18 is a perspective view of a fiber optic enclosure having a module deck therein.

FIG. 19 is a schematic view of a method of forming a removable module in accordance with this disclosure.

DETAILED DESCRIPTION

Figure 3:
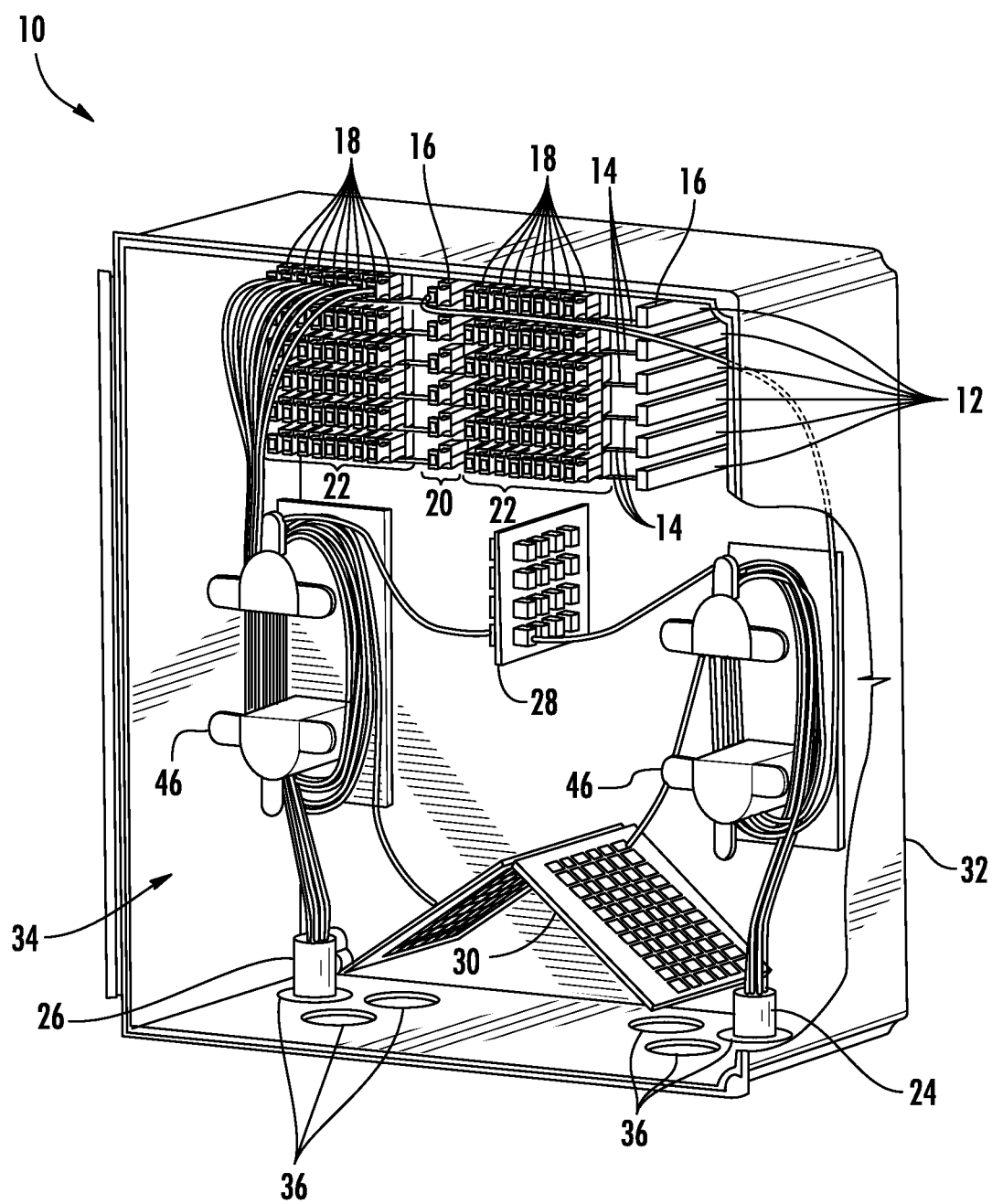
FIG. 3 is a perspective, schematic view of an embodiment of a fiber optic terminal in accordance with the present disclosure.

Reference will now be made in detail to the embodiments, examples of which are illustrated in the accompanying drawings. Whenever possible, like reference numbers will be used to refer to like components or parts. One embodiment of a fiber optic terminal 10, which may also be referred to as a local convergence point (LCP), a fiber distribution hub (FDH), a fiber distribution terminal (FDT), or the like, is illustrated in FIG. 3. The fiber optic terminal 10 includes modules holders 12 that accept removable, configurable modules 14 to allow for increased customization. The removable modules 14 include input and output adapters 16, 18 for feeder and distribution fiber connections. The module holders 12 are aligned in the fiber optic terminal 10 such that when two or more modules 14 are positioned in the module holders 12, the input and distribution adapters 16, 18 of the modules 14 are aligned to form input and distribution fields 20, 22 in the fiber optic terminal 10. In traditional terminals, the input and distribution fields are fixed and fully pre-configured. In other words, a terminal that will service 132 clients will have a fixed distribution field having spaces for 132 output adapters. The fixed distribution field typically requires a large amount of space in the terminal and thus requires a larger terminal with additional costs associated with installation. In addition, the fixed distribution field is a separate element from the splitter modules. In contrast, the fiber optic terminal 10 of the present disclosure need not include fixed input and distribution fields because the removable modules 14 include input and distribution adapters 16, 18 that together form input and distribution fields 20, 22 when the removable modules 14 are inserted into the module holders 12. Thus, the size of the input and distribution fields 20, 22 in the fiber optic terminal 10 of the present disclosure is adaptable according to network demand. Each new module 14 that is added to the fiber optic terminal 10 includes the necessary input and distribution adapters 16, 18 for the fiber optic terminal 10. As such, the input and distribution capacity of the fiber optic terminal 10 is dynamically adjusted based on the number of modules 14 present in the fiber optic terminal 10.

Each removable module 14 may include one or more of the following: a splitter, cable or fiber storage components, pass-through fiber components, connector parking components, splice components, input adapters, and distribution adapters. For example, in some embodiments, the modules 14 each include a 1×4 splitter, two 1×4 splitters, a 1×8 splitter, a 1×16 splitter or a 1×32 splitter. In these embodiments, the number of input adapters 16 and the number of output adapters 18 corresponds to the split ratio (i.e., a module 14 having a 1×4 splitter has one input adapter 16 and four output adapters 18 and a module 14 having a 1×8 splitter has one input adapter 16 and eight output adapters 18).

The fiber optic terminal 10 is customizable by incorporating modules 14 having the required functionality. For example, a fiber optic terminal 10 used for splitting each incoming signal into four separate signals may have one or more modules 14 having 1×4 splitters. In another example, a fiber optic terminal 10 used for splitting each incoming signal into eight separate signals may have one or more modules 14 having 1×8 splitters. In other embodiments, a fiber optic terminal 10 may have multiple uses. For example, a single fiber optic terminal 10 may be used for splitting a signal into four separate signals and for passing-through an un-split signal. Thus, the user would incorporate at least one module 14 having pass-through components and at least one module 14 having a 1×4 splitter. In other words, a single fiber optic terminal 10 may include a combination of modules 14 having different functionality (i.e., a combination of modules, where some modules have splitters, some modules have cable or fiber storage components, some modules have pass-through fiber components, some modules have splice components, and some modules have parking components). The modules 14 are interchangeable in the fiber optic terminal 10, thus eliminate the need for complex SKU management and allowing the user to assemble the desired configuration using a small set of standard parts.

The fiber optic terminal 10 may also include dedicated components, such as one or more patch panels 28 for pass-through fibers and one or more parking panels 30 for unused connectors, although these components are not required in every embodiment.

Referring again to FIG. 3, the fiber optic terminal 10 may include an enclosure 32 defining an interior space 34 that houses the plurality of module holders 12 and modules 14. The plurality of module holders 12 are configured to removably accept the modules 14 to customize the fiber optic terminal 10, as described above.

Figure 1:
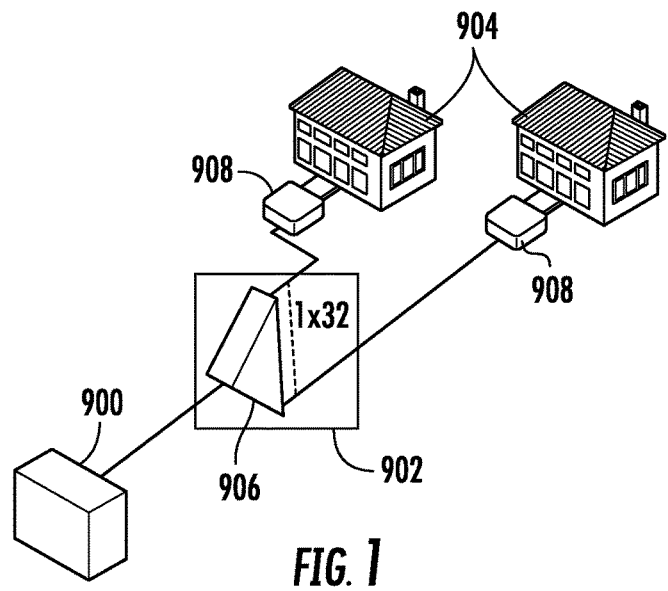
FIG. 1 is a schematic view of an embodiment of a centralized split fiber optic network.
Figure 2:
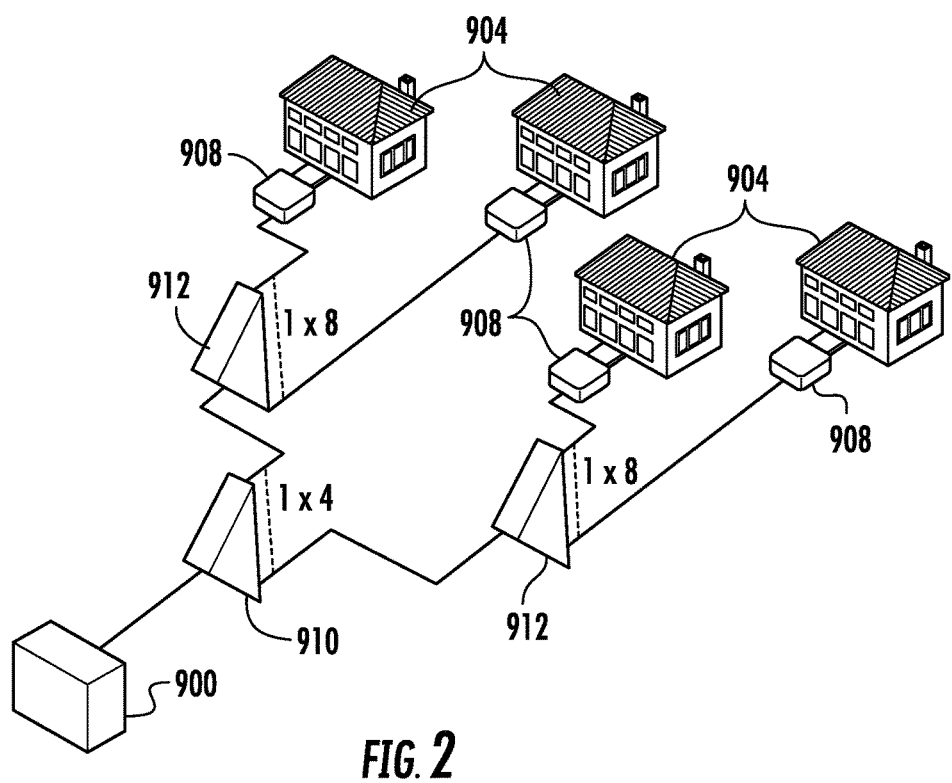
FIG. 2 is a schematic view of an embodiment of a distributed split fiber optic network.

The enclosure 32 in FIG. 1 is a generally elongated, rectangular shape, but may be any suitable shape and size. In one embodiment, the enclosure 32 may have a small form factor having an overall length of about 15 inches, an overall width of about 15 inches, and an overall depth of about 6 inches, although other sizes are within the scope of this disclosure.

The enclosure 32 may also be made of any suitable material, such as a rigid metal or plastic material.

While not depicted, the enclosure 32 may include a cover that is affixed to the enclosure 32. The cover and the enclosure 32 serve to close off and protect the internal components of the fiber optic terminal 10 when the cover of the enclosure 32 is closed, and may include security features such as a security screw or external lock.

In some embodiments, the enclosure 32 is designed to be versatile such that it can be mounted in different environments. For example, the enclosure 32 may be configured for mounting on a strand, a floor, a wall, a conduit, a pole, a pedestal, a rack, or underground to provide compatibility with service provider's mounting preferences.

The enclosure 32 may also be provided with optional build-out features (for example, expansion rings or deep doors) to optionally increase the depth and capacity of the enclosure 32 for the purposes of adding expanded capacities at a later date. Such features may eliminate the need for civil placement costs and/or permitting as demands on the network require additional fiber placement. In other embodiments, the enclosure 32 may include external features that allow a user to attach another enclosure 32 on top of an existing enclosure 32.

The enclosure 32 may include one or more ports 36 for receiving feeder cables 24 and distribution cables 26 into the interior space 34. In some embodiments, the ports 36 are initially closed and must be opened by punching out material in the port, otherwise known as "punch-out" ports. Unused ports may remain closed and then may be "punched-out" to allow for additional feeder or distribution cables 24, 26. While the enclosure 32 of FIG. 3 includes multiple ports 36, in other embodiments the enclosure 32 may include a single port 36 for both feeder and distribution cables 24, 26. In yet other embodiments, the enclosure 32 may include connector adapters in the ports 36 to receive connectors associated with the feeder and distribution cables.

The terms "feeder cable," "distribution cable," "fiber optic cables" and/or "optical fibers" include all types of single mode and multi-mode light waveguides. The waveguides may be coated, colored, buffered, ribbonized, and/or have other organizing or protective structures. The waveguides may be located in one or more tubes and the cable may also include other features, such as strength members, jackets, or the like. Suitable waveguides include optical fibers such as bend-insensitive optical fibers or any other expedient of a medium for transmitting light signals. An example of a bend-insensitive optical fiber is ClearCurve® Multimode fiber commercially available from Corning Incorporated. The term "feeder cable" as used herein should be understood to include, without limitation, transport cables, back haul cables, and the like. The term "distribution cable" as used herein should be understood to include, without limitation, branch cables, drop cables, and the like.

The fiber optic terminal 10 may be configured to accept stubbed and non-stubbed, preconnectorized or non-preconnectorized cables. As such, the ports 36 may be a pass-through type ports with standard hub and/or grommet functionality or may have a fiber optic adapter seated therein. For example, a fiber optic adapter may be seated within each port 36 and each fiber optic adapter may be configured to receive a single optical fiber connector or multiple optical fiber connectors, including, without limitation, SC, LC, MTP, OptiTap®, or OptiTip™ adapters commercialized by Corning Cable Systems LLC, Hickory, N.C.

In some embodiments, the enclosure 32 is preconfigured with one or more feeder cables 24, one or more distribution cables 26, or both feeder and distribution cables 24, 26. In some embodiments, additional feeder or distribution cables 24, 26 are included to facilitate rapid deployment of the enclosure 32.

Figure 4:
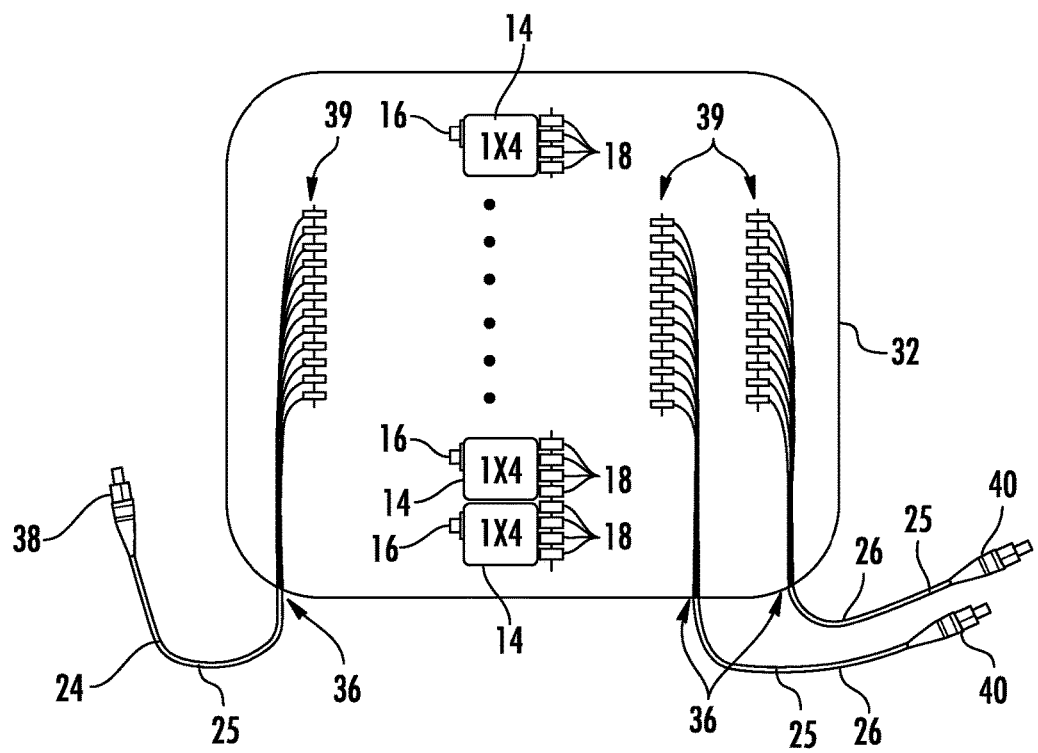
FIG. 4 is a schematic view of an example embodiment of a fiber optic terminal in accordance with the present disclosure.

For example, referring now to FIG. 4, in some embodiments one or more multi-fiber harnesses 25 including a multifiber connector 38, 40 at one end and a plurality of LC or SC single fiber connectors 39 at the opposite end may be pre-installed in one or more of the ports 36 of the enclosure 32. The multifiber connectors 38, 40 may be positioned outside the enclosure 32 while the single fiber connectors 39 are housed within the enclosure 32 for connection to the input and distribution adapters 16, 18 of the removable modules 14.

In some embodiments, the gender of the feeder cable connector 38 (i.e., male connector or female connector) may be opposite from the gender of the distribution cable connectors 40 to allow for rapid insertion or removal of the enclosure 32 into/from a distribution network without the need for planning or modification of the fiber connections or cabling system. In addition, the opposite gender of the feeder and distribution cable connectors 38, 40 allows for serial placement of multiple enclosures 32 or rapid bypassing of an enclosure 32 to allow for expressing of un-modified or un-split fibers deeper into the network.

Referring still to FIG. 4, in some embodiments the enclosure 32 includes at least one feeder cable 24 and at least one distribution cable 26 having connectors 38, 40 external to the enclosure 32, wherein the feeder cable connector 38 is a pinned connector while the distribution cable connector 40 is non-pinned connector. A pinned connector is one example of a male connector and a non-pinned connector is one example of a female connector. In other embodiments, the orientation may be reversed so that the distribution cable connector 40 is a pinned connector while the feeder cable connector 38 is non-pinned connector. As used herein, the term "pinned connector" means a fiber optic receptacle having at least one protruding feature to facilitate alignment of a fiber optic plug in the receptacle. As used herein, the term "non-pinned connector" means a fiber optic plug having at least one cavity to facilitate alignment of the fiber optic plug in a receptacle. In use, the protruding feature of the pinned connector aligns with the cavity of the non-pinned connector to align optical fiber(s) of the pinned connector with optical fiber(s) of the non-pinned connector. Like the configuration described in the preceding paragraph, this configuration allows for serial placement of multiple enclosures 32 or rapid bypassing of an enclosure 32. While only one feeder cable 24 and two distribution cables 26 are shown in FIG. 4, an enclosure 32 may include any number of feeder cables 24 and distribution cables 26.

FIG. 5 illustrates a system 400 having multiple enclosures 32 each having a feeder cable connector 38 that is a pinned connector and distribution cable connectors 40 that are a non-pinned connector. In this embodiment, a telecommunications line 498 having furcation points 496 with furcation lines 494 with furcation connectors 492 can connect with the feeder cable connectors 38 and distribution cable connectors 40 of multiple enclosures 32 to achieve a desired network configuration.

Referring again to FIG. 3, the enclosure 32 includes a plurality of module holders 12 configured to hold removable modules 14. The module holders 12 allow for configuring, and re-configuring, if needed, the fiber optic closure 10 by inserting, removing, and/or re-positioning one or more of the modules 14. Such configuring or re-configuring may also include routing, connecting, or changing the routing or connection of one or more optical fibers between modules 14.

The module holders 12 may include one or more rail guides (see e.g., rail guide 226 in FIG. 17) to accept and removably retain the modules 14 in the module holders 12. The module holders 12 may be positioned within the enclosure 32 so that modules 14 are aligned in columns and rows. To provide for optical fiber routing efficiency and ease of use, columns of modules holders 12 may be position adjacent to one another and rows of module holders 12 may be vertically aligned so that the modules 14 form vertically aligned input and distribution fields 20, 22. Each of the modules 14 may be separately and independently inserted, removed, and repositioned in the module holders 12 making the fiber optic terminal 10 modular and variably configurable.

The fiber optic terminal 10 may include any number of module holders 12. In some embodiments, for example, the fiber optic terminal 10 includes 3, 6, 9, or 12 module holders 12. For the removal of doubt, each module holder 12 need not include a module 14 at all times. Thus, the number of modules 14 positioned inside the enclosure may be less than the total number of module holders 12.

Figure 6:
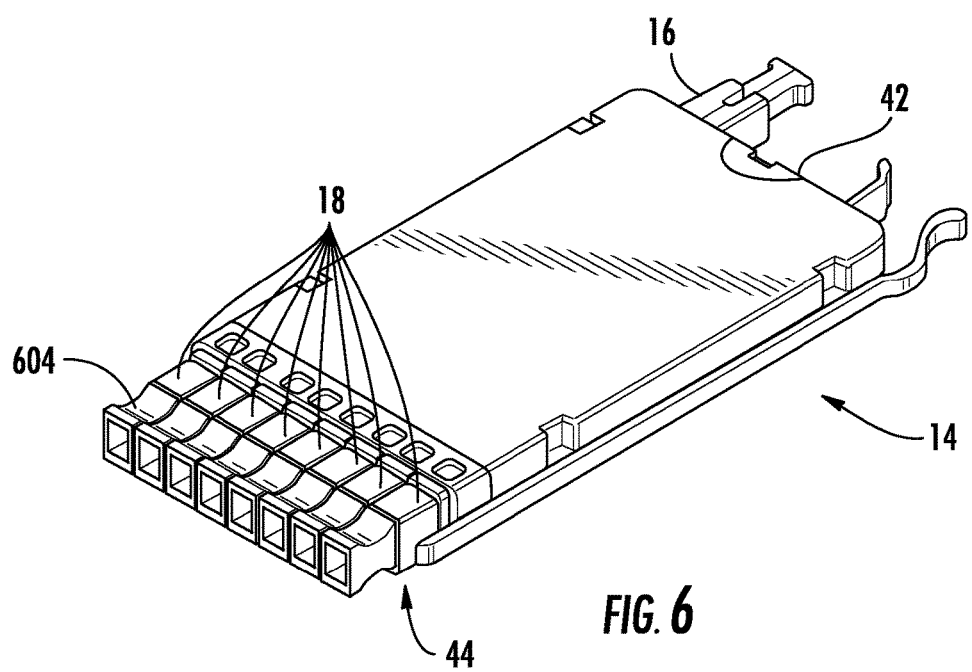
FIG. 6 is a front, perspective view of an example embodiment of a module in accordance with the present disclosure.

FIG. 6 illustrates an example embodiment of a module 14 for use in the fiber optic closure 10. The module 14 includes an input adapter 16 on the rear face 42 of the module 14 and a plurality of output adapters 18 on the front face 44 of the module 14. The output adapters 44 are arranged in a single row but may be arranged in any suitable fashion. In other embodiments, for example, the output adapters 44 are arranged in two rows on the front face 44 of the module 14.

Figure 7:
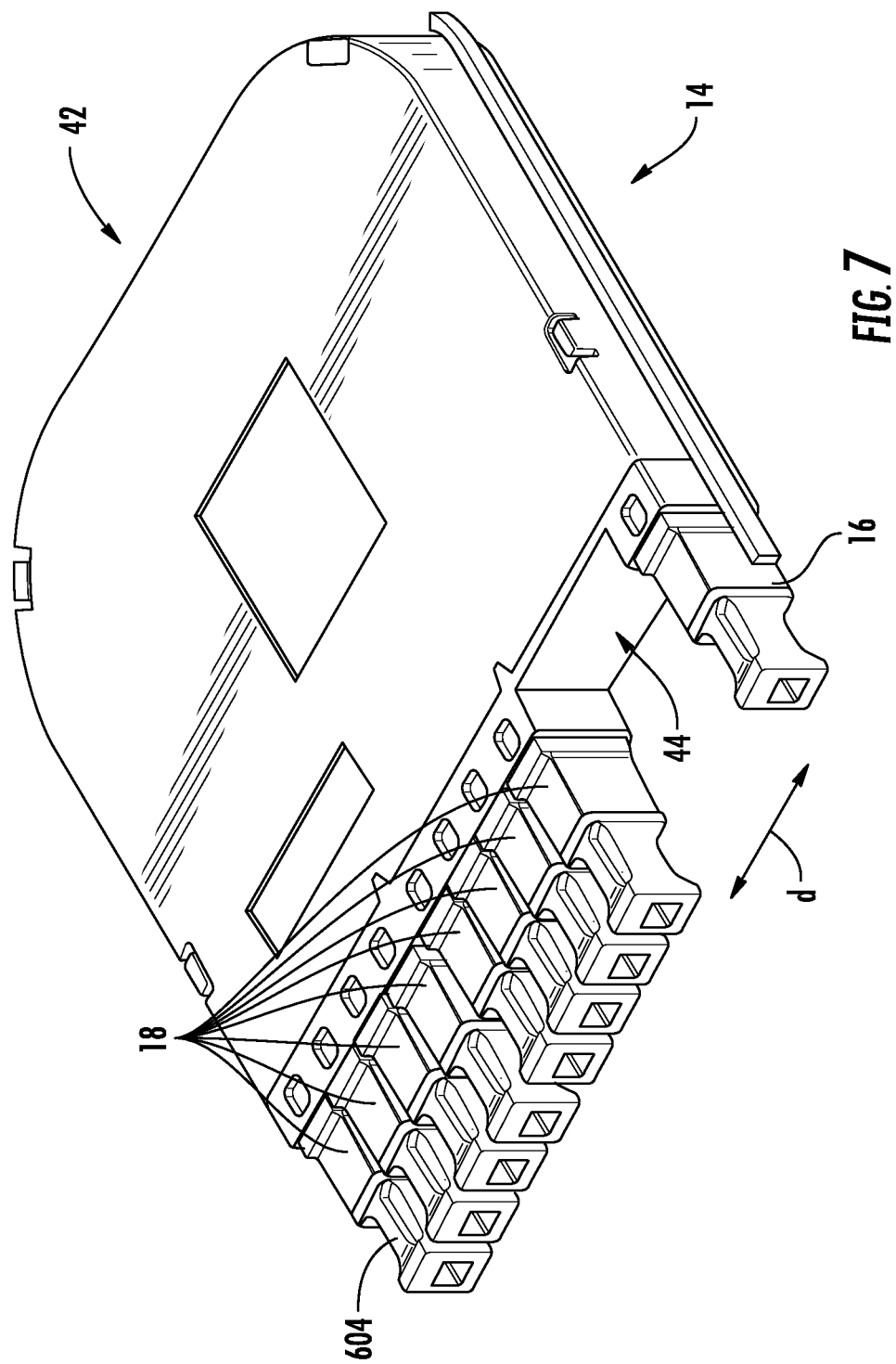
FIG. 7 is a front, perspective view of another example embodiment of a module in accordance with the present disclosure.

FIG. 7 illustrates another example embodiment of a module 14 for use in the fiber optic closure 10. The module 14 includes an input adapter 16 on the front face 44 (also called the front side) of the module 14 and a plurality of output adapters 18 that are also located on the front face 44 (also called the front side) of the module 14. The input adapter 16 is spaced from the plurality of output adapters 18 by a distance d that is greater than the distance between each of the plurality of output adapters 18. In some embodiments, the spaced-apart placement of the input adapter 16 helps a user identify the input adapter 16 for correct installation of input and output connectors. Although not illustrated, the module 14 may include more than one input adapter 16, such as, for example, two input adapters 16, on the front face 44 of the module 14.

In other embodiments, the module 14 does not include input adapters 16 but rather an input fiber is spliced into the module 14. In yet other embodiments, the module 14 is configured to allow for spliced input fibers as well as connectorized input fibers. Likewise, the modules 14 may include openings for the splicing of output fibers in addition to, or in place of, the distribution adapters 18.

In some embodiments, the feeder and distribution cables 24, 26 include connectorized fibers that can be coupled directly to the input and output adapters 16, 18 of the modules 14. Thus, an optical connection may be established between the one or more optical fibers in the feeder cable 24 and the one or more optical fibers in the distribution cable 26 through the module 14 without the need to engage a separate input field or separate distribution field in the fiber optic terminal 10.

The modules 14 can be configured with any suitable adapter type. For example, in some embodiments the modules 14 include LC adapters while in other embodiments the modules 14 include SC adapters. The adapters 16, 18 may be factory installed in the modules 14 or may be installed in the field by a technician. Likewise, the modules 14 may be factory installed in the module holders 12 or may be installed in the field by field personnel as network demand increases.

As discussed above, the modules 14 may include one or more of the following: a splitter, cable or fiber storage components, pass-through fiber components, parking components, splice components, and the like. Modules 14 that include a splitter may include a number of input and distribution adapters 16, 18 corresponding to the split ratio of the splitter. For example, a module 14 that includes a 1×8 splitter may include 1 input adapter 16 and eight distribution adapters 18. Likewise, a module 14 that includes a double 1×4 splitter may include 2 input adapters 16 and eight distribution adapters 18.

Although the individual modules 14 may contain different features, such as splitters, cable or finer storage components, pass-through fiber components, parking components, splice components and the like, the modules 14 may have a uniform shape and size to allow for interchangeability of the modules 14 within standard sized module holders 12.

Referring again to FIG. 3, the fiber optic closure 10 may include additional, fixed features in addition to the module holders 12 and modules 14. For example, the fiber optic terminal 10 may include a pass-through patch panel 28 including adapters to allow for pass-through (non-split) fibers. The pass-through fibers may be used to provide higher bandwidth necessary for lower split level or un-split subscribers which require higher power for longer distances. Many service providers deploy separate fiber networks for residential customers that typically have lower overall bandwidth requirements, and business customers that typically have higher overall bandwidth requirements. The fiber optic closure 10 containing either dedicated pass-through adapters or modules 14 including pass-through components gives a user the ability to manage both split fibers and pass-through fibers in a single network, reducing costs significantly.

The fiber optic terminal 10 may also include a dedicated parking panel 30 including parking adapters to enable management of unused fibers until there is a need for future network expansion.

The fiber optic terminal 10 may also include dedicated fiber management features 46. The optical fibers route around the fiber management features 46 to manage the routing of the optical fibers and accommodate any slack. This allows the field technician to effectively and easily accommodate varying lengths of the optical fibers and identify the particular optical fibers. The fiber management may be accomplished in the fiber optic terminal 10 by dedicated fiber management features 46, modules 14 having fiber management components, or both dedicated fiber management features 46 and modules 14 having fiber management components.

The fiber optic terminal 10 may also include dedicated splitters (not shown) having high split ratios, such as 1×16, 1×32 or 1×64 splitters. Such splitters may have input and output pigtails and may be fixed to the fiber optic terminal 10 to accommodate various network configurations.

Figure 8:
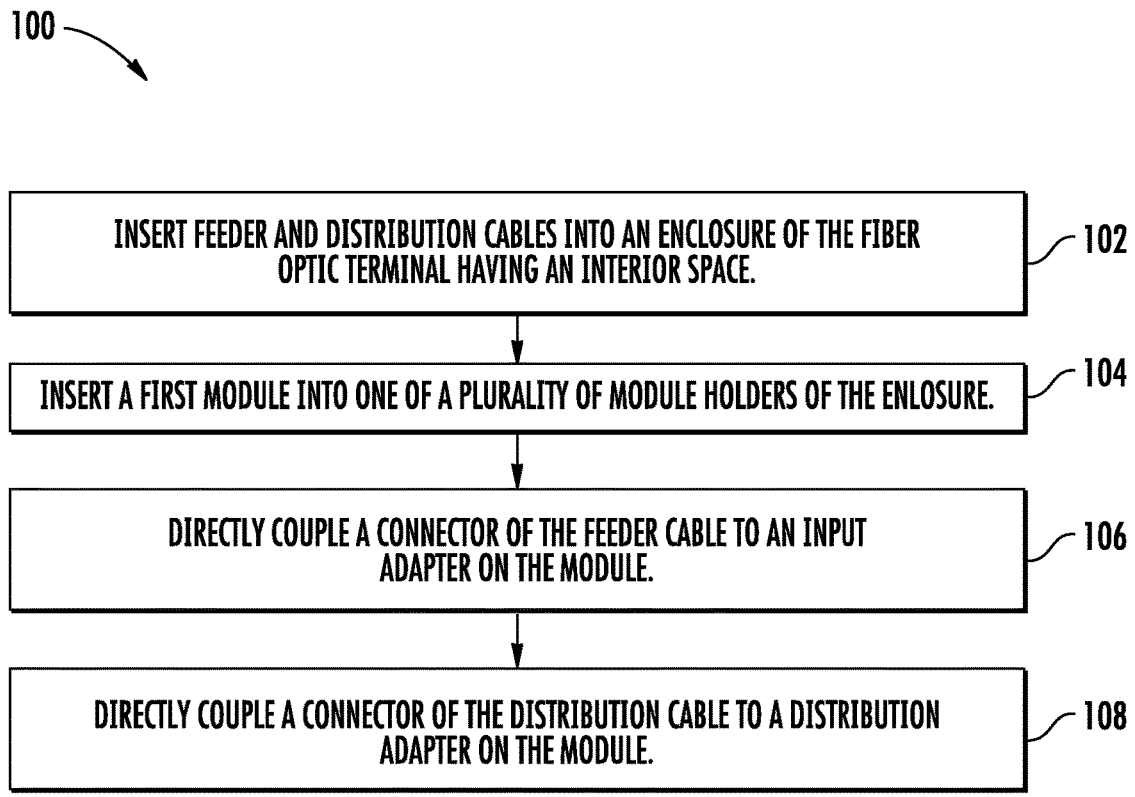
FIG. 8 is a schematic view of a method of forming a fiber optic terminal in accordance with this disclosure.

Referring now to FIG. 8, a method 100 of forming a fiber optic terminal 10 is illustrated. The method 100 begins and a feeder cable 24 and a distribution cable 26 are inserted into an enclosure 32 defining an interior space 34, as illustrated at block 102. The feeder and distribution cables 24, 26 include optical fibers each having a fiber optic connector. A first module 14 is inserted into one of a plurality of module holders 12 of the enclosure 32, as illustrated at block 104. The connector 38 of the feeder cable 24 is then directly coupled to an input adapter 16 on the module 14, as illustrated at block 106, and the connector 40 of the distribution cable 26 is directly coupled to an output adapter 18 on the module 14, as illustrated at block 108. In some embodiments, the connector 38 of the feeder cable 24 is connected to an input adapter 16 on a rear face 42 of the module 14 while the connector 40 of the distribution cable 26 is connected to an adapter 18 on a front face 44 of the first module 14. In other embodiments, the connector 38 of the feeder cable 24 is connected to an adapter 16 on a front face 44 of the module 14 while the connector 40 of the distribution cable 26 is connected to an adapter 18 that is also on a front face 44 of the first module 14. By directly coupling the connector 38 of the feeder cable 24 to the input adapter 16 and directly coupling the connector 40 of the distribution cable 26 to the output adapter 18, the installation process for connecting the fiber optic terminal 10 to a network is greatly simplified and installation time is greatly reduced.

FIGS. 6-16 illustrate various views of another embodiment of a module 14 for use in a fiber optic terminal or other application. While the module 14 is described in connection with a fiber optic terminal, it is to be understood that the module 14 may be used in other applications besides a fiber optic terminal.

Figure 9:
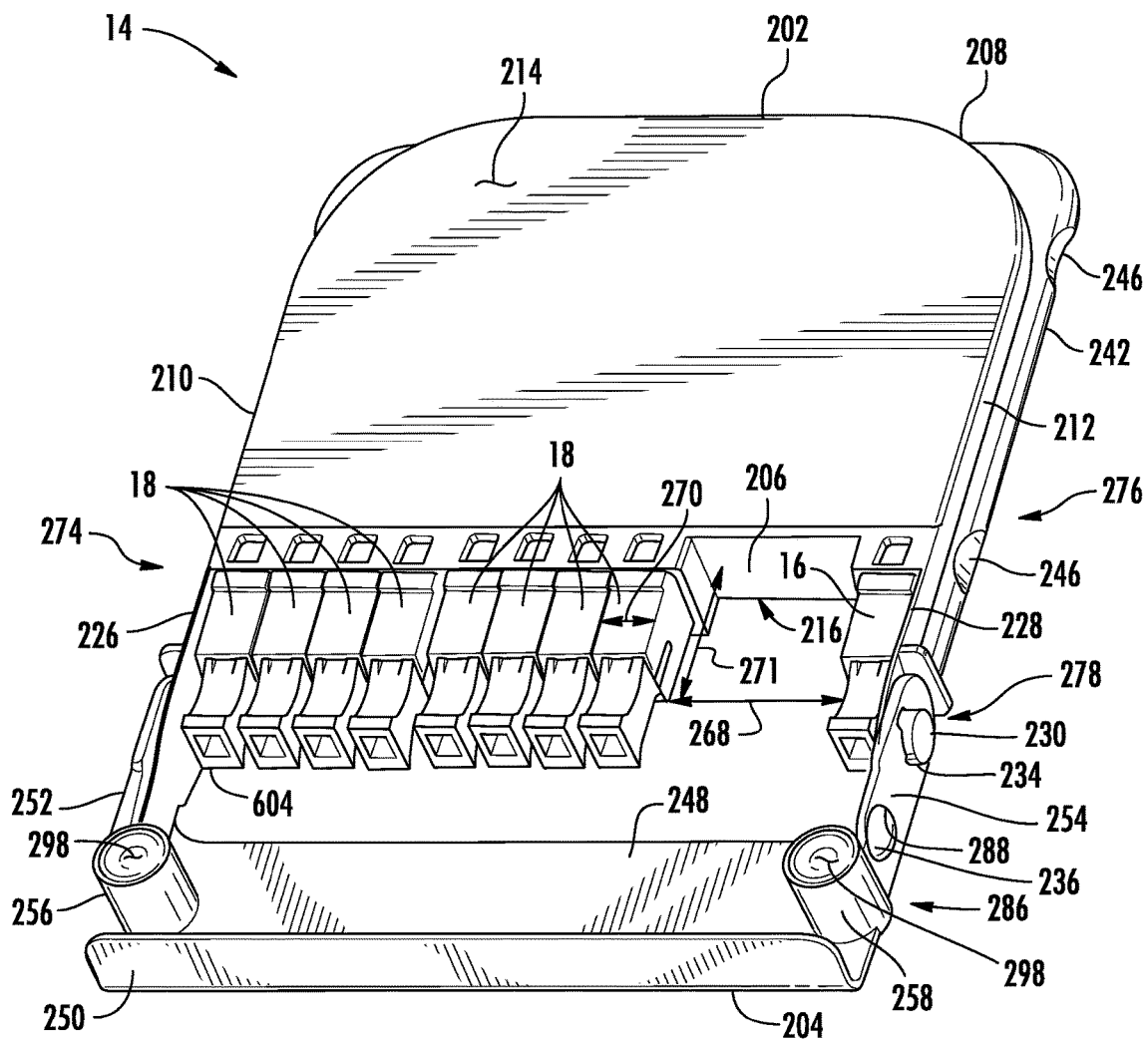
FIG. 9 is perspective view of yet another example embodiment of a module in accordance with the present disclosure.
Figure 20:
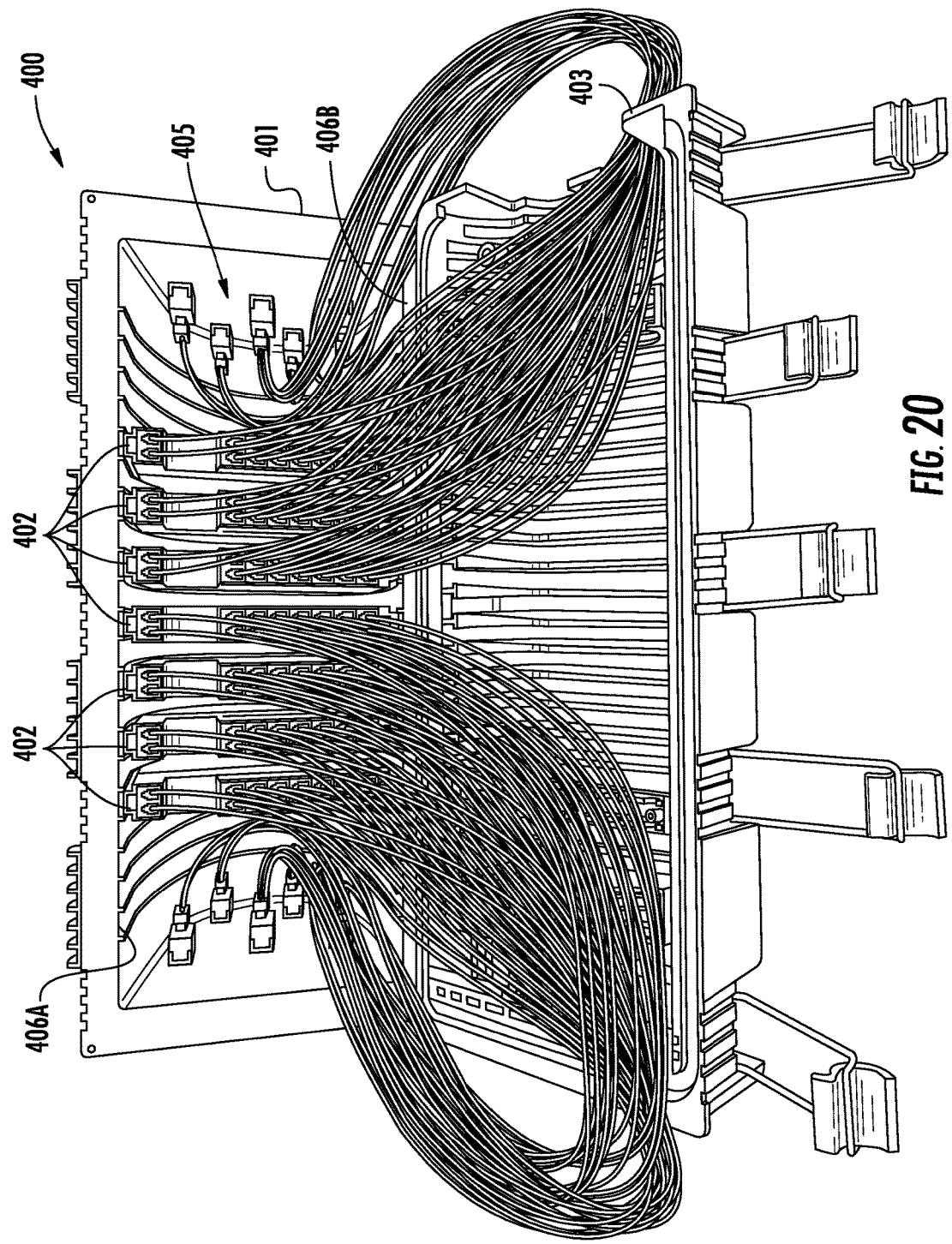
FIG. 20 is a perspective view of another embodiment of a fiber optic terminal in accordance with the present disclosure.

The module 14 includes a body 202, a handle 204 that is removably coupled to the body 202, and input and output adapters 16, 18 on the body 202. The module 14 is positionable in a module holder 12 of a fiber optic terminal 10, as described above. The module 14 is reversible, such that the module 14 can be positioned in a first position in which the top face 214 of the module 14 is upwards in the module holder 12, as illustrated in FIG. 20, or the module can be positioned in a second position in which the bottom face 216 (FIG. 10) of the module 14 is upwards in the module holder 12 (the module 14 shown in FIG. 9 is positioned with the bottom face 216 upwards).

The reversible nature of the module 14 allows for customization of the location of the input adapters 16 and output adapters 18 in the fiber optic terminal 10. For example, in FIG. 17 the module holders 12 are aligned vertically in a column and the modules 14 are installed with the top face 214 upwards. As such, the input adapters 16 is on the right hand side of the module deck 264 and the output adapters 18 are located on the left hand side of the module deck 264. Alternatively, the same modules 14 may be installed with the bottom face 216 upwards (not shown) so that the input adapters 16 are on the left hand side of the module deck 264 and the output adapters 18 are located on the right hand side of the module deck 264. Likewise, the handle 204 on each module is reversibly attachable to the module 14 to allow for customization of the orientation of the input and distribution fibers 290, 292, as discussed in more detail below. The reversibility of the body 202 and the handle 204 provides for routing efficiency, enhanced organizational options, and ease of use for the modules 14 within a fiber optic terminal 10.

Figure 10:
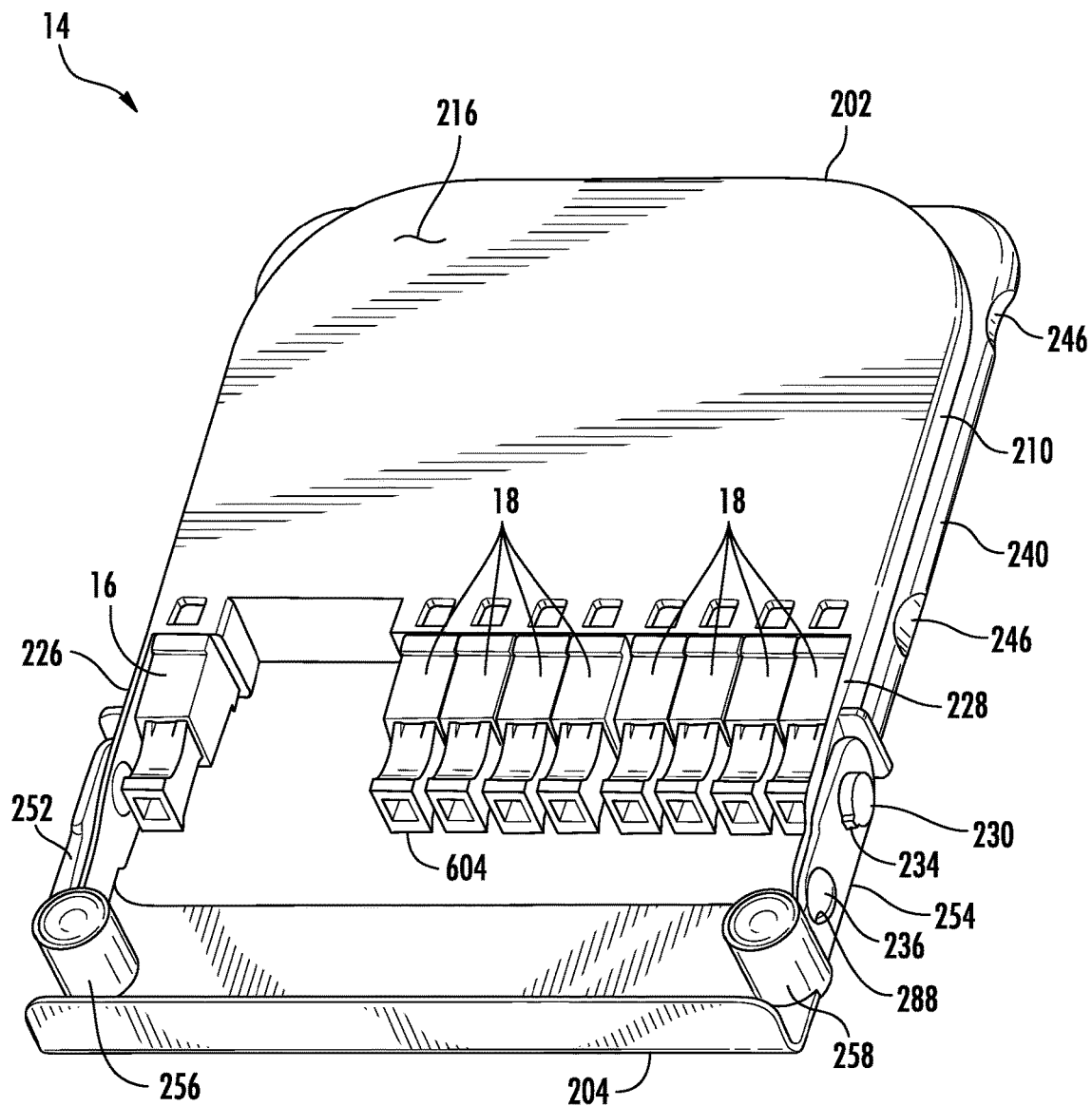
FIG. 10 is perspective view of the module of FIG. 8 with the body of the module in an inverted position and the handle in a second orientation.
Figure 12:
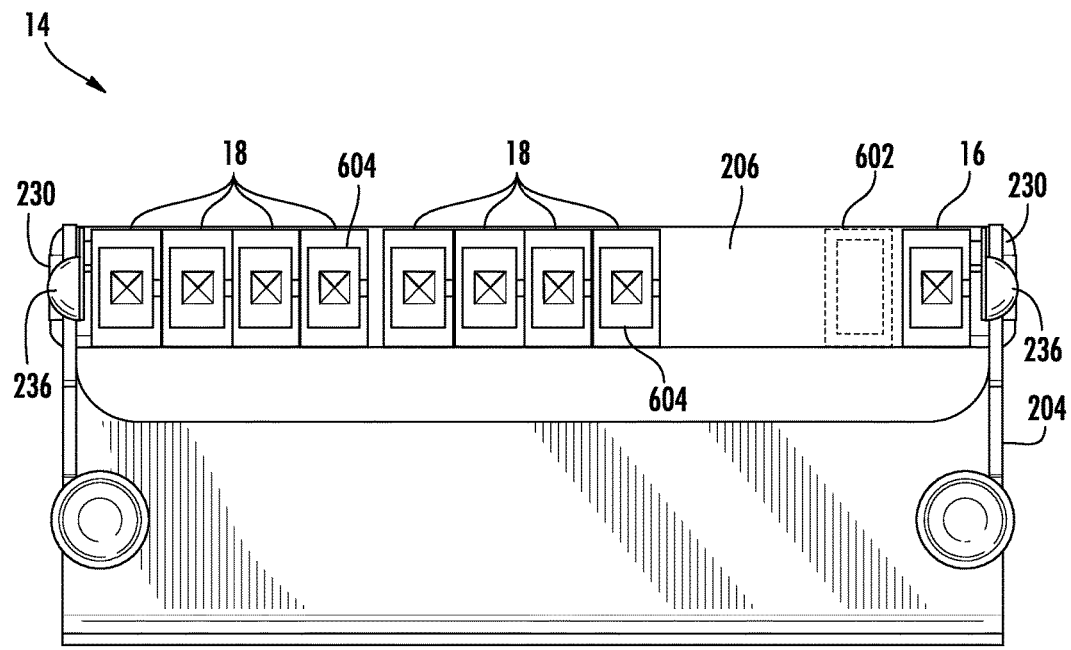
FIG. 12 is front view of the module of FIG. 8.
Figure 13:
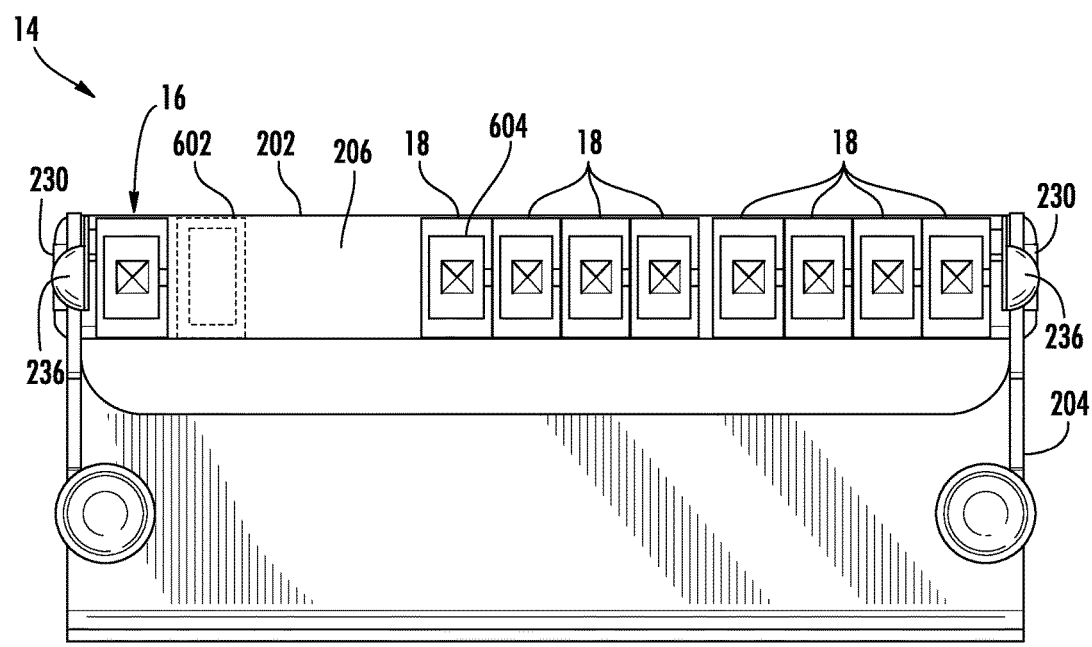
FIG. 13 is a front view of the module of FIG. 8 with the body of the module in an inverted position and the handle in the open position.

Referring again to FIG. 9, the body 202 of the module 14 includes a front side 206, a rear side 208, a first side 210, a second side 212, a top side 214, and a bottom side 216 (see FIG. 10). The front side 206 of the body 202 includes one or more input adapters 16 and one or more output adapters 18 to receive connectorized input and output optical fibers or optical fiber cables, respectively. The input and output adapters 16, 18 may be any suitable type of adapter, such as, for example, LC adapters or SC adapters. FIGS. 12 and 13 illustrated a second input adapter 602 in phantom lines on the front side 206 to show a possible location for the second input adapter 602. The input and output adapters 16, 18 are shown with dust caps 604 in FIGS. 3, 6, 7, 9, 10, 12, 13, and 17, however, it is understood that the dust caps 604 are removable to expose a connection point of the adapters 16, 18.

Referring again to FIG. 9, in some embodiments the input adapter 16 is spaced from the output adapters 18 by a distance 268 as an error proofing feature to assist a technician in correctly identifying the input adapters 16 from the output adapters 18, and vice versa. The distance 268 between the input adapter 16 and the output adapters 18 may be at least as wide as the width 270 of one of the output adapters 18. In some cases, the distance 268 between the input adapter 16 and the output adapters 18 is at least twice as wide as the width 270 of one of the output adapters 18. While only one input adapter 16 is shown in FIG. 8, the module 14 may include any number of input adapters 16. Likewise, the module 14 may include any number of output adapters 18.

Figure 11:
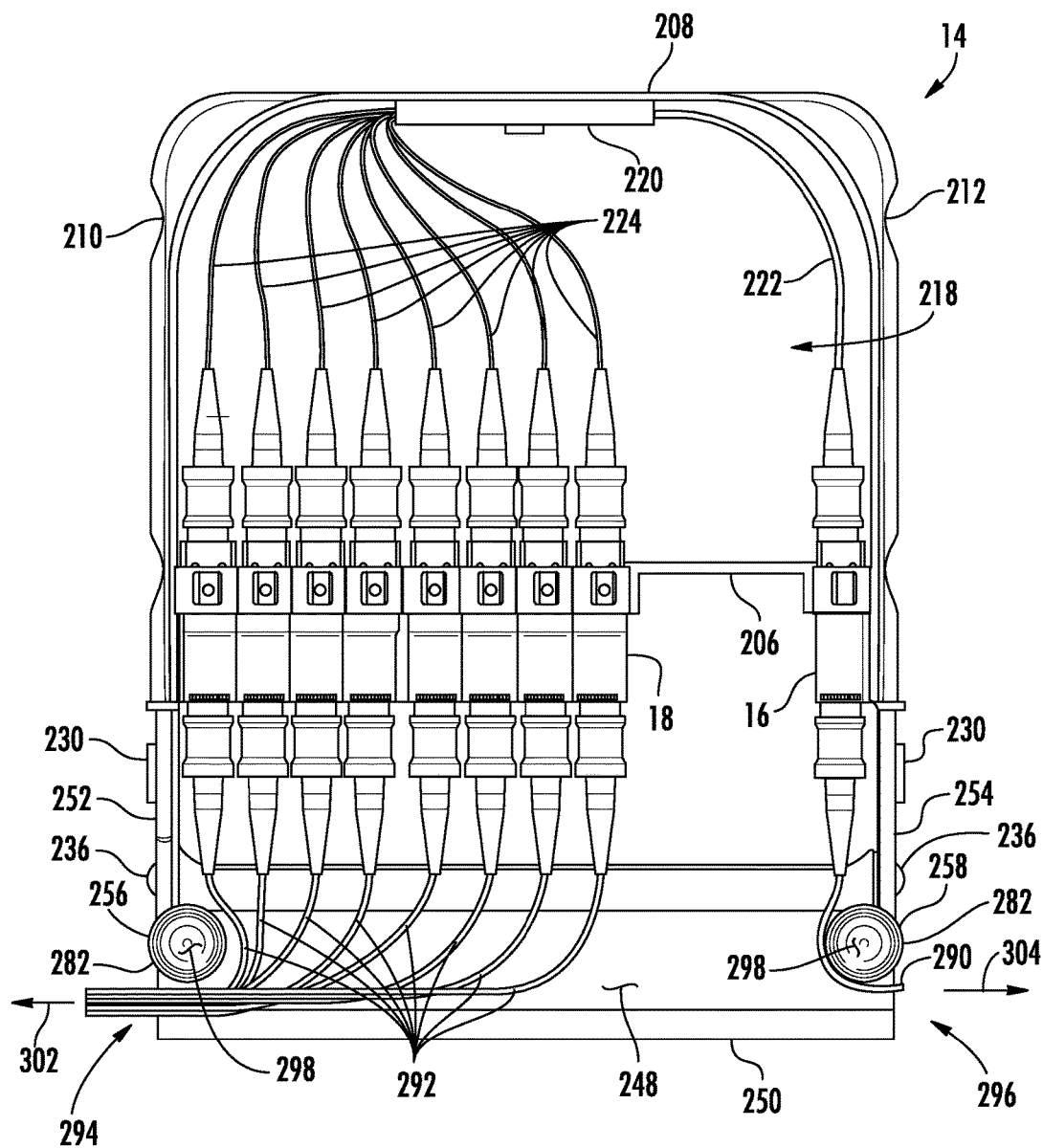
FIG. 11 is a top, schematic view showing an example embodiment of the interior space of the module of FIG. 8.

Referring now to FIG. 11, the body 202 also includes an interior space 218 between the front side 206, the rear side 208, the first side 210, the second side 212, the top side 214 (FIG. 9) and the bottom side 216 (FIG. 10). The interior space 218 may house one or more components, such as, but not limited to, a splitter, cable storage components, fiber storage components, pass-through fiber components, parking components, and splice components, as well as optical fibers 222, 224 for coupling the input and output adapters 14, 16 to the one or more components. In the example embodiment of FIG. 17, the interior space 218 of the module includes a splitter 220, and optical fibers 222, 224 connecting the splitter to the input and output adapters 16, 18. The input adapter 16 is coupled to the splitter 220 by an input optical fiber 222 and the output adapters 18 are coupled to the splitter 220 by output optical fibers 224.

The term "splitter" as used herein should be understood to include any form of passive or active optical splitting, coupling, or wavelength managing device, including without limitation, a passive optical splitter, fused biconic taper coupler (FBT), wave length division multiplexer/demultiplexer (WDM), coarse wavelength division multiplexer/demultiplexer (CWDM), dense wave division multiplexer/demultiplexer (DWDM), and the like. The terms "cable storage components" as used herein should be understood to include any repository for holding excess cable length, including without limitation, reels, cable channels, flanges, tie-wraps, slots, hubs and the like. The term "fiber storage components" as used herein should be understood to include any repository for holding excess fiber length, including without limitation, routing rings, tie-wraps, slots, channels, storage flanges, hubs and the like. The term "pass-through fiber components" as used herein should be understood to include any feature that couples a first fiber to a second fiber without substantial modification to the signal carried by the first and second fibers. The term "parking components" as used herein should be understood to include any feature for temporarily holding a connector, or connectorized or unconnectorized fiber. The term "splice components" as used herein should be understood to include any feature for holding or protecting a permanent connection between two optical fibers, including without limitation, heat shrink splice protectors, crimp splice protectors, and the like.

Referring again to FIG. 9, the body 202 also includes a first arm 226 extending from a first end 274 of the front side 206 and a second arm 228 extending from a second end 276 of the front side 206. The first and second arms 226, 228 may extend beyond the front side 206 a distance at least as great as the depth 271 of the input and output adapters 16, 18. Thus, in some embodiments, the first and second arms 226, 228 provide some protection to the input and output adapters 16, 18. The first and second arms 226, 228 are also configured to hold the removable handle 204, as will be described in more detail below.

The first and second arms 226, 228 each include a hinge protrusion 230 and a locking protrusion 236. The hinge protrusions 230 extend laterally from the first and second arms 226, 228 and provide a hinging point for the removable handle 204. The hinge protrusions 230 may be any suitable shape and size, such as, for example, a cylindrical shape. In some embodiments, the hinge protrusions 230 each include a lateral extension 234 (FIGS. 14, 15 and 16) near a free-standing end of the hinge protrusion 230. The lateral extensions 234 of the protrusions 230 secure the handle 204 to the first and second arms 226, 228 when the handle 204 is in a closed position (the closed position is illustrated in FIGS. 9, 10, 11 and 14) and allow the handle 204 to be removed from the first and second arms 226, 228 when the handle 204 is in the open position (the open position is illustrated in FIGS. 12, 13 and 15).

The locking protrusions 236 of the first and second arms 226, 228 are positioned near a freestanding end of the first and second arms 226, 228. The locking protrusions 236 removably lock the handle 204 in the closed position. In the embodiments illustrated herein, the locking features 236 comprise a semicircular bulge on the exterior surface of the first and second arms 226, 228, but the locking features 236 may be any other physical feature that releasably locks the first and second arms 226, 228 to the handle 204 when the handle 204 is in the closed position. As described in more detail below, the locking features 236 engage second openings 288 of the handle 204 when the handle 204 is in the closed position to releasably hold the handle 204 in the closed position.

The handle 204 interacts with the first and second arms 226, 228 to manage and direct fibers and/or cables that are coupled to the adapters 16, 18. Referring specifically to FIG. 11, the handle 204 includes a first body portion 248, a second body portion 250 that extends perpendicularly from the first body portion 248, a first sidewall 252 extending from a first end of the first body portion 248, a second sidewall 254 extending from a second end of the first body portion 248, a first fiber guide 256 positioned near the first sidewall 252, and a second fiber guide 258 positioned near the second sidewall 254.

The first body portion 248 and the second body portion 250 provide surfaces against which feeder and distribution cables or fibers rest when coupled to the input and output adapters 16, 18. For example, FIG. 11 illustrates an example input fiber 290 and example output fibers 292 resting against the first and second body portions 248, 250. The first body portion 248 supports the feeder and distribution fibers 290, 292 from excessive sagging when connected to the input and output adapters 16, 18. The second body portion 250 helps direct the fibers 290, 292 away from the module 14 in first or second lateral directions 302, 304 to assist with fiber management in the fiber optic terminal 10.

The first and second fiber guides 256, 258 also assist with directing the input and distribution fibers 290, 292 away from the module 14 in first and second lateral directions 302, 204. The first and second fiber guides 256, 258 have curved outer surfaces 282 to prevent the fibers 290, 292 from bending at too severe of an angle, which can damage the fiber 290, 292 or cause undesirable attenuation of the optical signal. In use, the fibers 290, 292 pass through a space 294 between the first fiber guide 256 and the second body portion 250 or the space 296 between the second fiber guide 258 and the second body portion 250.

The first and second fiber guides 256, 258 also include concave surfaces 298 configured to provide a finger hold for a user. As described in more detail below, the user places a finger on the concave surfaces 298 to apply a force to the handle 204 when moving the handle 204 between the closed and open positions.

The removal of the handle 204 from the first and second arms 226, 228 of the body 202 will now be described with reference to FIGS. 14-16. In the closed position illustrated in FIG. 14, the hinge protrusion 230 of the first and second arms 226, 228 is located within the first openings 238 of the first and second sidewalls 252, 254 of the handle 204. The hinge protrusion 230 provides a pivot point for rotational movement of the handle 204 with respect to the first and second arms 226, 228 of the body 202.

The lateral extension 234 of the hinge protrusions 230 is misaligned with a keyhole 260 of the first openings 238 of the handle 204 so that the handle 204 is not removable from the first and second arms 226, 228 of the body 202. The locking protrusions 236 engage the second openings 288 of the first and second arms 226, 228 to hold the handle 204 in the closed position.

Figure 14:
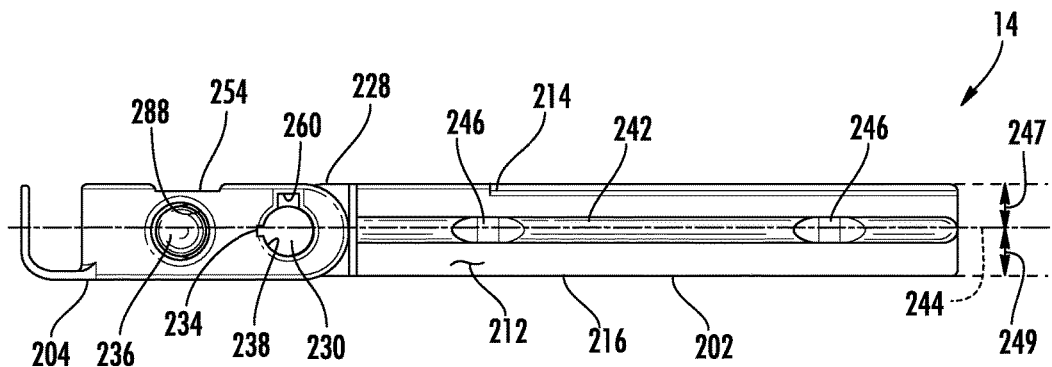
FIG. 14 is side view of the module of FIG. 8 with the handle in the closed position.
Figure 15:
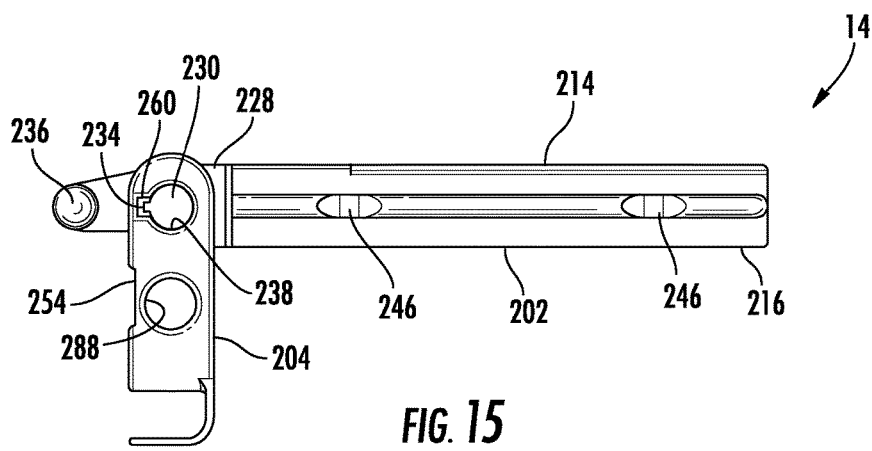
FIG. 15 is side view of the module of FIG. 8 with the handle in the open position.
Figure 16:
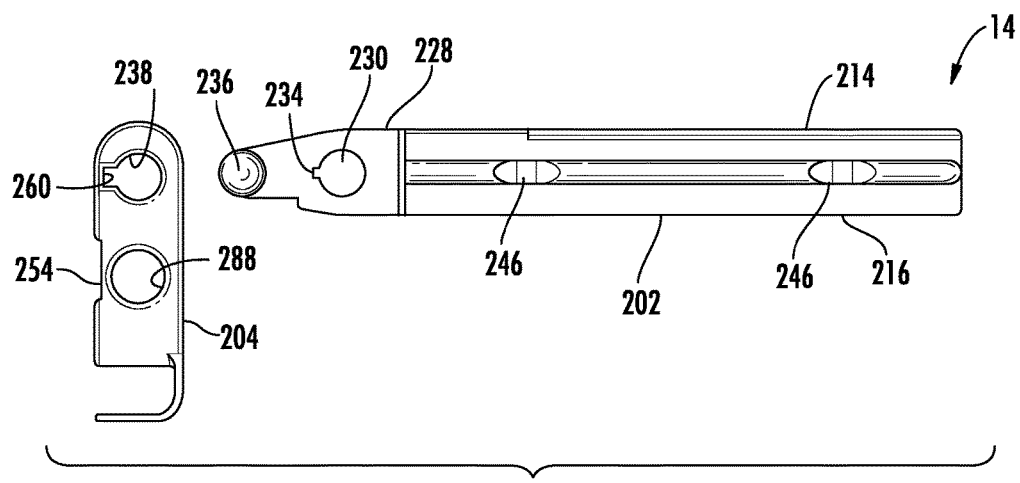
FIG. 16 is a side view of the module of FIG. 10 with the handle removed from the body.

To move the handle 204 from the closed position (the closed position is shown in FIG. 14) to the open position (the open position is shown in FIG. 15), the first and second arms 226, 228 are deflected by applying an inward force on the locking protrusions 236 so that the locking protrusions 236 are released from the second openings 288 of the handle 204. The handle 204 is then rotatable about the hinge protrusions 230 from the closed position to an open position.

FIG. 15 illustrates the handle 204 in the open position. In the open position, the handle 204 is removable from the first and second arms 226, 228 as the lateral extension 234 is aligned with the keyhole 260 of the hinge protrusion 230. The first and second sidewalls 252, 254 can be moved outwardly away from the first and second arms 226, 228 until hinge protrusions 230 are released from the first openings 238 of the handle 204. The handle 204 can then be completely removed from the first and second arms 226, 228, as illustrated in FIG. 16.

The handle 204 may then be re-attached to the body 202 in the same orientation or a reversed orientation (i.e, such that the first and second fiber guides 256, 258 face the bottom surface 216 of the body, as illustrated in FIG. 9). Thus, the handle 204 is reversible to allow for proper fiber management when the body 202 is in either a first orientation (i.e., with the top surface 214 facing upwards) or a second orientation (i.e., with the bottom face 216 facing upwards).

The terms "left side," "right side," "upward," downward," "top," "bottom" and similar terms are used for convenience of describing the attached figures and are not intended to limit this description. For example, the terms "left side" and "right side" are used with specific reference to the drawings are not intended to limit this description. Rather, the module 14 may be installed in other orientations in a reversible manner. For example, the module 14 may be installed in a closure such that the top surface 214 facing upward or facing downwards, to the right side, to the left side, or any other non-vertical direction.

To attach the handle 204 to the body 202, the second openings 288 of the handle 204 are placed over the hinge protrusions 230 of the first and second arms 226, 228 and the keyholes 260 (best shown in FIG. 15) of the first and second sidewalls 252, 254 are aligned with the lateral extensions 234 of the first and second arms 226, 228. The first and second sidewalls 252, 254 then move into place against the first and second arms 226, 228 so that the protrusions 230 and the second openings 288 formed a hinged connection, as discussed above.

The handle 204 may then be rotated approximately 90 degrees from the open position (FIG. 15) to the closed position (FIG. 14). As the handle 204 rotates from the open position towards the closed position, the first and second sidewalls 248, 250 contact the locking protrusions 236 of the first and second arms 226, 228. As force is applied to the handle 204 toward the closed position, the first and second sidewalls 252, 254 force the first and second arms 226, 228 inward toward the input and output adapters 16, 18 until the first openings 238 of the handle 204 align with the locking protrusions 236 of the first and second arms 226, 228. The locking protrusions 236 of the first and second arms 226, 228 then spring outwardly until the locking protrusions 236 are at least partially located within the second openings 262 of the handle 204.

Referring again to FIGS. 9 and 10, the body 202 also includes a first flange 240 extending from the first side 210 of the body 202 and a second flange 242 extending from the second side 212 of the body. In some embodiments, the first and second flanges 240, 242 comprise a single, unitary flange.

Referring momentarily to FIG. 14, the first and second flanges 240, 242 (while only the second flange is visible in FIG. 14, the first flange 240 is directly opposite from the second flange and is similarly located) are located at a center line 244 of the body 202 such that a first distance 247 from the top surface 214 of the body 202 to the first and second flanges 240, 242 is equal to a second distance 249 from the bottom surface 216 of the body to the first and second flanges 240, 242. The central location of the first and second flanges 240, 242 allows the body 202 to be reversibly installed in a module holder 12.

Figure 17:
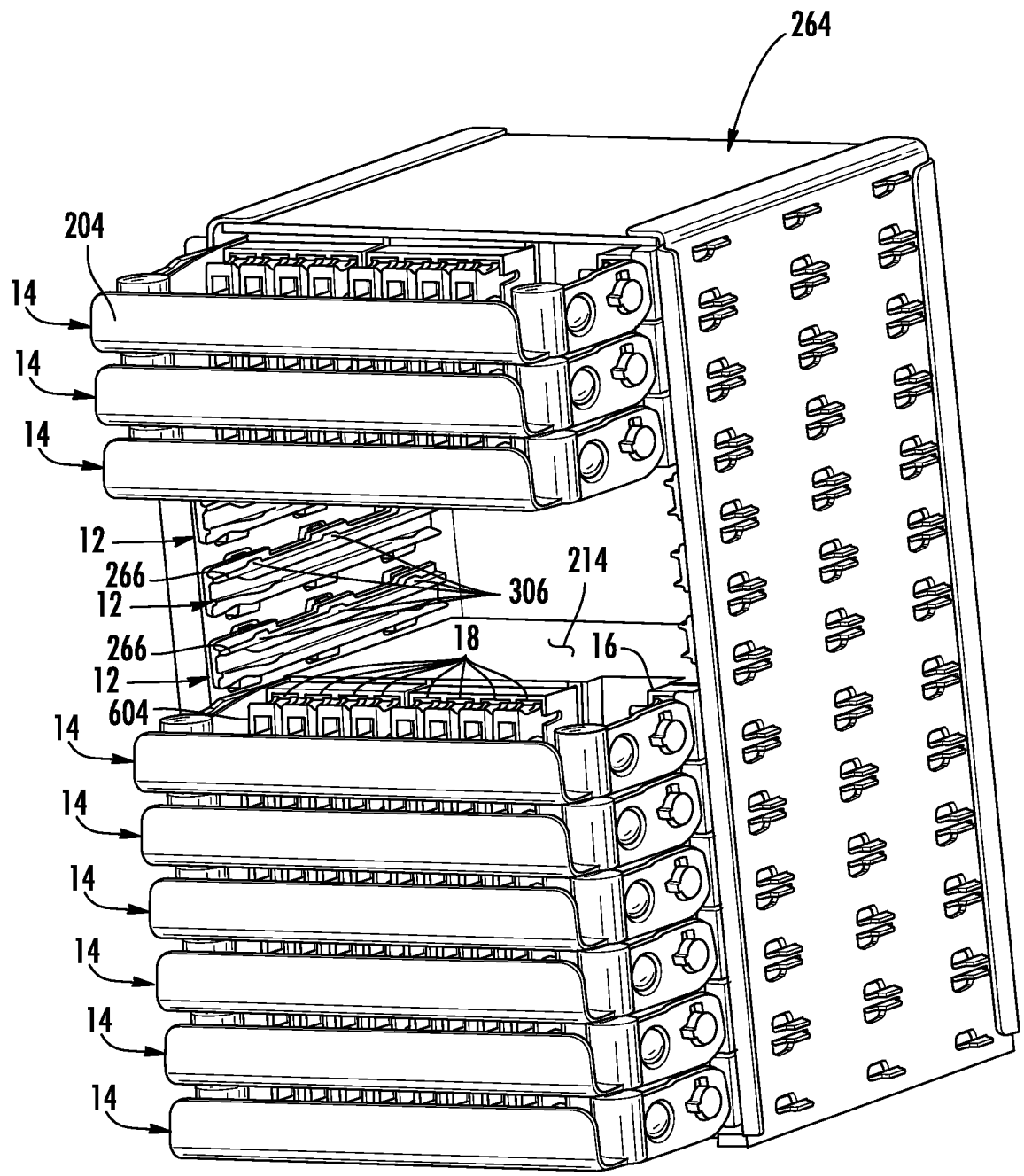
FIG. 17 is a perspective view of an example module deck having a plurality of removable modules therein.

FIG. 17 illustrates a module holder deck 264 that includes a plurality of modules holders 12. A plurality of modules 14 are installed in some of the module holders 12 while other module holders are unused. As discussed above, each module holder 12 of the module deck 264 need not include a module 14 at all times. Instead, the module deck 264 may include only those modules 14 that are required for a particular network installation.

In FIG. 20, the modules 14 are installed in the module holder deck 264 in a first orientation, similar to the orientation illustrated in FIG. 9 (i.e., the top surface 214 of the module 14 is facing upwards in the module holder deck 264). However, the modules 14 may also be installed in the module holder deck 264 in the second orientation, similar to the orientation shown in FIG. 9 (i.e., the bottom surface 216 of the module is facing upwards in the module holder deck 264).

The modules 14 are slideably received in the module holder deck 264 by sliding the first and second flanges 240, 242 in corresponding rail guides 266 of the module holders 12. In some embodiments, the railguides 266 include registration features 306 to removably hold the modules 14 on the rail guides 266. The registration features 306 interact with detents 246 (FIG. 9) on the first and second flanges 240, 242 to frictionally hold the modules 14 on the rail guides 266 when the modules 14 are fully installed.

FIG. 18 illustrates an example fiber optic enclosure 10 that includes a module holder deck 264 having a plurality of removable modules 14 secured therein.

FIG. 19 illustrates an example method 400 of forming a fiber optic module 14. As illustrated at block 402, one or more elements are inserted into an interior space 218 of a fiber optic module 14, wherein the one or more elements are selected from the group comprising: a splitter, cable storage components, fiber storage components, pass-through fiber components, parking components, and splice components. As illustrated at block 404, the method may also include removably coupling a handle 204 to the first and second arms 226 228 of the fiber optic module 14, wherein the handle 204 is rotatable with respect to the first and second arms 226, 228 between an open position and a closed position. The first and second arms 226 each include a hinge protrusion 230 that mates with first openings 238 on the handle 204 to hingedly couple the handle 204 to the body 202. The first and second arms 226, 228 also include locking protrusions 236 that are locatable within the openings 288 in the handle 204 to releaseably maintain the handle 204 in the closed position. The first and second arms 226, 228 are deflectable to release the locking features 236 from the second openings 288 to allow the handle 204 to rotate from the closed position to the open position.

Figure 21:
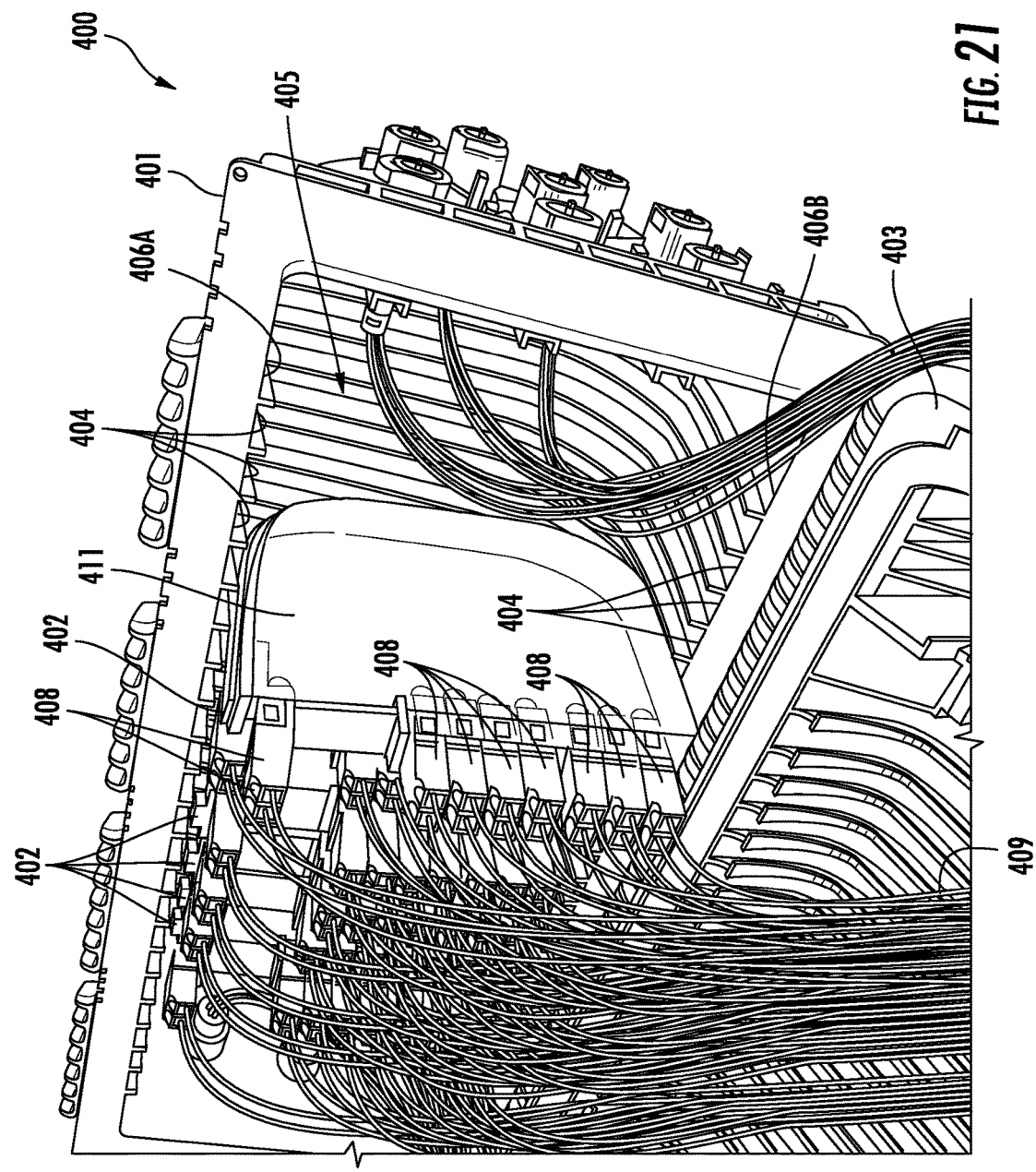
FIG. 21 is a magnified perspective view of the fiber optic terminal illustrated in FIG. 20.

FIGS. 20 and 21 illustrate an embodiment of a sealable closure 400 having removable modules 402 positionable therein. The closure 400 includes a base 401, a cover 403, and an interior 405 defined by the base 401 and the cover 403 when the cover 403 is in a closed position (not shown). The interior 405 may be sealed by the base 401 and the cover 403 when the cover is in a closed position to prevent the ingress of water, dust and air. The base 401 includes a plurality of slots 404 for receiving removable modules 402 therein. The slots 404 are formed in the opposite walls 406A, 406B of the base 401 so that an additional frame is not needed to hold the removable modules 402 in the closure 400. The modules 402 may be secured in the slots 404 by way of a friction fit, mechanical fastener, or some other fixing mechanism. The positioning of the modules 402 directly in the slots 404 on the inner surfaces 406A, 406B of the closure 400 may reduce the space required to hold the modules 402 compared with closures having separate rack systems (not shown) to hold elements of the closure.

In some embodiments, the modules 402 are shaped to fit snugly within the slots 404 so that the outer permimeter of the module 402 corresponds to the shape of the inner surfaces 406A, 406B of the closure 400. Thus, space is not wasted behind or around the modules 402 when installed in the closure 400.

In some embodiments, the slots 404 of the closure 400 are positioned adjacent to each other to allow for adjacent positioning of the removable modules 402 when the modules 402 are placed within the closure 400. All of the slots 404 need not include a module 402 and the modules 402 may be added or removed from the closure 400 as needed.

In use, the required modules 402 slide into the slots 404 in the closure 400. For example, FIG. 21 illustrates a first module 411 as it slides into a slot 404 of the closure 400. Adapters 408 (FIG. 21) on the modules 402 are then coupled to fibers 409 which may include any suitable connector or connectors. When additional modules 402 are needed, the modules 402 can simply be added to vacant slots 404 in the closure 400 by sliding the desired modules 402 into the vacant slots 404. The additional modules 402 are then connected to the appropriate cables 409 to provide the desired functionality and connectivity.

It is to be understood that the disclosure is not to be limited to the specific embodiments disclosed and that modifications and other embodiments are intended to be included within the scope of the appended claims. It is intended that the present disclosure cover the modifications and variations of this disclosure provided they come within the scope of the appended claims and their equivalents. Although specific terms are employed herein, they are used in a generic and descriptive sense only and not for purposes of limitation.

What is claimed is:
1. A fiber optic terminal, comprising:
an enclosure;
a plurality of module holders within the enclosure;

a first module removably positioned in at least one of the plurality of module holders, wherein the first module comprises
  a first side opposite a second side wherein the first side is spaced apart from the second side by a front side including one or more input adapters and a plurality of output adapters,
  a first arm extending from a first end of the front side and a second arm extending from a second end of the front side,
  a handle reversibly attached to the first arm and the second arm wherein in a first orientation a first sidewall of the handle couples to the first arm and a second sidewall of the handle couples to the second arm and in a second orientation the first sidewall of the handle couples to the second arm and the second sidewall of the handle couples to the first arm,
  a top surface extending from the first side to the second side and opposite a bottom surface offset from the top surface and extending from the first side to the second side, and
  a first flange extending from the first side and a second flange extending from the second side opposite the first flange, wherein the first flange and the second flange are located at a first distance from the top surface and a second distance from the bottom surface, the first distance is equal to the second distance, and the first module is reversibly installed in a first module holder of the plurality of module holders, such that in a first module orientation the top surface of the first module faces a first direction and in a reversibly installed second orientation the bottom surface of the first module faces the first direction.

2. The fiber optic terminal of claim 1, wherein the enclosure comprises a module deck, wherein the module deck comprises the plurality of module holders.

3. The fiber optic terminal of claim 1, wherein the enclosure comprises a cover hingedly coupled to a base and the cover comprises the plurality of module holders.

4. The fiber optic terminal of claim 3, wherein the plurality of module holders comprise a plurality of slots in the cover.

5. The fiber optic terminal of claim 1, wherein the first module further comprises a first input adapter of the one or more input adapters coupled to an input of an optical component of the first module and a plurality of first output adapters coupled to respective outputs of the optical component of the first module, wherein the first input adapter is spaced from the plurality of first output adapters by a first distance and the first distance is greater than a second distance between each of the plurality of output adapters.

6. The fiber optic terminal of claim 5, wherein the first distance is at least as wide as a width of one of the plurality of output adapters.

7. The fiber optic terminal of claim 5, wherein the first distance is at least twice as wide as a width of one of the plurality of output adapters.

8. The fiber optic terminal of claim 1, wherein the first module further comprises one or more first elements selected from the group comprising: a splitter, cable storage components, fiber storage components, pass-through fiber components, parking components, and splice components.

9. The fiber optic terminal of claim 1, further comprising a second module removably positioned in a second module holder of the plurality of module holders, wherein the second module is positioned adjacent the first module in the plurality of module holders and the second module comprises:
  a first side opposite a second side wherein the first side is spaced apart from the second side by a front side including one or more input adapters and one or more output adapters;
  a top surface extending from the first side to the second side and opposite a bottom surface offset from the top surface and extending from the first side to the second side; and
  a first flange extending from the first side and a second flange extending from the second side opposite the first flange, wherein the first flange and the second flange are located at a first distance from the top surface and a second distance from the bottom surface, the first distance is equal to the second distance, and the second module is reversibly installed in the second module holder of the plurality of module holders, such that in a first module orientation the top surface of the second module faces the top surface of the first module and in a reversibly installed second orientation the bottom surface of the second module faces the top surface of the first module.

10. A fiber optic terminal, comprising:
an enclosure comprising a cover and a base, the enclosure defining an interior space, a feeder cable port, and a distribution cable port;
a feeder cable having a feeder optical fiber and a feeder connector;
a distribution cable having a distribution optical fiber and a distribution connector;
a plurality of module holders in the interior space; and
at least one module removably positioned in one of the plurality of module holders, wherein the at least one module comprises
  a first side opposite a second side wherein the first side is spaced apart from the second side by a front side including one or more input adapters and a plurality of output adapters,
  a first arm extending from a first end of the front side and a second arm extending from a second end of the front side,
  a handle reversibly attached to the first arm and the second arm wherein in a first orientation a first sidewall of the handle couples to the first arm and a second sidewall of the handle couples to the second arm and in a second orientation the first sidewall of the handle couples to the second arm and the second sidewall of the handle couples to the first arm,
  a top surface extending from the first side to the second side and opposite a bottom surface offset from the top surface and extending from the first side to the second side,
  a first flange extending from the first side and a second flange extending from the second side opposite the first flange, wherein the first flange and the second flange are located at a first distance from the top surface and a second distance from the bottom surface, the first distance is equal to the second distance, and the first module is reversibly installed in a first module holder of the plurality of module holders, such that in a first module orientation the top surface of the first module faces a first direction and in a reversibly installed second orientation the bottom surface of the first module faces the first direction, and one or more first elements selected from the group comprising: a splitter, cable storage components, fiber storage components, pass-through fiber components, parking components, and splice components;

wherein the feeder connector is directly coupleable to the one or more input adapters and the distribution connector is directly coupleable to one of the plurality of output adapters.

11. The fiber optic terminal of claim 10, wherein the plurality of output adapters are arranged in a single row.

12. The fiber optic terminal of claim 10, wherein the plurality of output adapters are arranged in at least two rows.

13. The fiber optic terminal of claim 10, wherein the handle is rotatable between a closed position and an open position.

14. The fiber optic terminal of claim 13, wherein the handle is removable from the first and second arms when the handle is in the open position and the handle is secured to the first and second arms when the handle is in the closed position.

15. The fiber optic terminal of claim 10, wherein each of the plurality of module holders comprises a rail guide for slideably receiving the at least one module.

16. The fiber optic terminal of claim 10, wherein the one or more input adapters are spaced from the plurality of output adapters by a first distance and the first distance is greater than a second distance between each of the plurality of output adapters.

17. The fiber optic terminal of claim 16, wherein the first distance is at least as wide as a width of one of the plurality of output adapters.

18. The fiber optic terminal of claim 16, wherein the first distance is at least twice as wide as a width of one of the plurality of output adapters.

19. A method of forming a fiber optic terminal, comprising:
    inserting a first module into one of a plurality of module holders of an enclosure, wherein the first module comprises
        a first side opposite a second side wherein the first side is spaced apart from the second side by a front side including one or more input adapters and a plurality of output adapters,
        a first arm extending from a first end of the front side and a second arm extending from a second end of the front side,
        a handle reversibly attached to the first arm and the second arm wherein in a first orientation a first sidewall of the handle couples to the first arm and a second sidewall of the handle couples to the second arm and in a second orientation the first sidewall of the handle couples to the second arm and the second sidewall of the handle couples to the first arm,
        a top surface extending from the first side to the second side and opposite a bottom surface offset from the top surface and extending from the first side to the second side, and
        a first flange extending from the first side and a second flange extending from the second side opposite the first flange, wherein the first flange and the second flange are located at a first distance from the top surface and a second distance from the bottom surface, the first distance is equal to the second distance, and the first module is reversibly installed in a first module holder of the plurality of module holders, such that in a first module orientation the top surface of the first module faces a first direction and in a reversibly installed second orientation the bottom surface of the first module faces the first direction;
    coupling a first feeder connector of a first feeder cable to a first input adapter on a first front face of the first module;
    coupling a first distribution connector of a first distribution cable to a first output adapter of a plurality of output adapters on the first front face of the first module;
    inserting a second module into one of the plurality of module holders of the enclosure;
    coupling a second feeder connector of a second feeder cable to a second input adapter on a second front face of the second module;
    coupling a second distribution connector of a second distribution cable to a second output adapter on the second front face of the second module;
    wherein the first module is configured to perform a first function selected from the group comprising: splitting a signal, passing-through an un-split signal, parking the first feeder connector, and parking the first distribution connector;
    wherein the second module is configured to perform a second function selected from the group comprising: splitting a signal, passing-through an un-split signal, parking the second feeder connector, and parking the second distribution connector; and
    wherein the first function is different than the second function.

20. The method of forming a fiber optic terminal of claim 19, wherein the first input adapter is spaced from the first output adapter by a first distance and the first distance is greater than a second distance between each of the plurality of output adapters.

21. The method of forming a fiber optic terminal of claim 20, wherein the first distance is at least as wide as a width of one of the plurality of output adapters.

22. The method of forming a fiber optic terminal of claim 20, wherein the first distance is at least twice as wide as a width of one of the plurality of output adapters.

23. A fiber optic terminal, comprising:
    an enclosure comprising a cover and a base;
    an interior space defined by the cover and the base when the cover is in a closed position;
    a plurality of module holder in the interior space, wherein the plurality of module holders comprise a plurality of slots formed in opposing walls of the base of the enclosure for receiving one or more modules; and
    a first module of the one or more modules removably positioned in at least one of the plurality of module holders, wherein the first module comprises:
        a first input adapter;
        a plurality of first output adapters, the first input adapter and the plurality of first output adapters are located on a first front face of the first module;
        one or more first elements selected from the group comprising: a splitter, cable storage components, fiber storage components, pass-through fiber components, parking components, and splice components;
        a first side opposite a second side wherein a first side is spaced apart from a second side by a front side including the first input adapter and the plurality of output adapters;

a first arm extending from a first end of the front side and a second arm extending from a second end of the front side; and a handle reversibly attached to the first arm and the second arm wherein in a first orientation a first sidewall of the handle couples to the first arm and a second sidewall of the handle couples to the second arm and in a second orientation the first sidewall of the handle couples to the second arm and the second sidewall of the handle couples to the first arm.

24. The fiber optic terminal of claim 23, wherein the first module further comprises:

a top surface extending from the first side to the second side and opposite a bottom surface offset from the top surface and extending from the first side to the second side, and a first flange extending from the first side and a second flange extending from the second side opposite the first flange, wherein the first flange and the second flange are located at a first distance from the top surface and a second distance from the bottom surface, the first distance is equal to the second distance, and the first, module is reversibly installed in a first module holder of the plurality of module holders, such that in a first module orientation the top surface of the first module faces a first direction and in a reversibly installed second orientation the bottom surface of the first module faces the first direction.

25. The fiber optic terminal of claim 23, wherein the first input adapter is spaced from the plurality of first output adapters by a first distance and the first distance is greater than a second distance between each of the plurality of output adapters.

* * * * *

UNITED STATES PATENT AND TRADEMARK OFFICE
CERTIFICATE OF CORRECTION

PATENT NO. : 10,295,771 B2  
APPLICATION NO. : 15/490162  
DATED : May 21, 2019  
INVENTOR(S) : Alan Duncan Burkett et al.

Page 1 of 1

It is certified that error appears in the above-identified patent and that said Letters Patent is hereby corrected as shown below:

On the Title Page

In Column 1, item (72), Inventors, Line 6, delete "Forth" and insert -- Fort --, therefor.

In the Claims

In Column 22, Lines 4-5, Claim 24, delete "first, module" and insert -- first module --, therefor.

Signed and Sealed this  
Twenty-seventh Day of August, 2019

Andrei Iancu  
*Director of the United States Patent and Trademark Office*